US012175497B1

(12) United States Patent
Hinkins

(10) Patent No.: US 12,175,497 B1
(45) Date of Patent: Dec. 24, 2024

(54) MEDIA AND TRAVEL SYSTEM AND METHOD OF USE

(71) Applicant: Ryan Don Hinkins, Sandy, UT (US)

(72) Inventor: Ryan Don Hinkins, Sandy, UT (US)

(*) Notice: Subject to any disclaimer, the term of this patent is extended or adjusted under 35 U.S.C. 154(b) by 27 days.

(21) Appl. No.: 18/114,853

(22) Filed: Feb. 27, 2023

Related U.S. Application Data

(63) Continuation of application No. 17/843,251, filed on Jun. 17, 2022, now abandoned, which is a continuation-in-part of application No. 16/057,985, filed on Aug. 8, 2018, now abandoned.

(60) Provisional application No. 62/627,090, filed on Feb. 6, 2018.

(51) Int. Cl.
*G06Q 30/00* (2023.01)
*G06Q 30/0241* (2023.01)
*G06Q 30/0251* (2023.01)

(52) U.S. Cl.
CPC ..... *G06Q 30/0265* (2013.01); *G06Q 30/0269* (2013.01); *G06Q 30/0277* (2013.01)

(58) Field of Classification Search
CPC .................................. G06Q 30/0207–30/0277
USPC ............................................... 705/14.1–14.73
See application file for complete search history.

(56) References Cited

U.S. PATENT DOCUMENTS

| | | | | |
|---|---|---|---|---|
| 6,034,688 A | * | 3/2000 | Greenwood | G06F 3/0485 |
| | | | | 715/784 |
| 6,499,027 B1 | * | 12/2002 | Weinberger | G06F 16/40 |
| 6,643,510 B2 | * | 11/2003 | Taylor | H04B 7/18506 |
| | | | | 455/431 |
| 6,757,712 B1 | * | 6/2004 | Bastian | B64D 11/0015 |
| | | | | 709/203 |
| 7,213,055 B1 | * | 5/2007 | Kathol | H04H 20/62 |
| | | | | 348/E7.085 |
| 7,487,938 B2 | * | 2/2009 | Brady, Jr. | H04L 61/2038 |
| | | | | 244/118.5 |
| 7,715,783 B2 | * | 5/2010 | Girard | H01Q 21/061 |
| | | | | 455/3.02 |
| 7,957,734 B2 | * | 6/2011 | Salkini | G01S 19/14 |
| | | | | 455/431 |
| 8,037,500 B2 | * | 10/2011 | Margis | H04N 21/2223 |
| | | | | 725/75 |
| 8,078,163 B2 | * | 12/2011 | Lemond | G06Q 30/04 |
| | | | | 455/431 |

(Continued)

FOREIGN PATENT DOCUMENTS

FR 2916841 A1 * 12/2008 ........... G01C 23/005
WO WO-2005000437 A2 * 1/2005 ......... H04N 21/4126

OTHER PUBLICATIONS

Lufthansa. Data Protection information. (Aug. 13, 2008). Retrieved online Jun. 19, 2021. https://www.lufthansa.com/xx/en/information-on-data-protection (Year: 2008).*

(Continued)

*Primary Examiner* — James A Reagan
(74) *Attorney, Agent, or Firm* — Richard Eldredge; Leavitt Eldredge Law Firm

(57) ABSTRACT

A media system having a platform accessible by an administration console and a passenger console, the platform providing for advertisement manipulation, creation, and editing by the administrator and providing for dynamically changing advertisement content for the passenger, the dynamically changing advertisement content including services, entertainment, and goods.

5 Claims, 21 Drawing Sheets

(56) References Cited

U.S. PATENT DOCUMENTS

| | | | | |
|---|---|---|---|---|
| 8,082,334 | B1* | 12/2011 | Oscherov | G06F 16/93 709/223 |
| 8,135,773 | B2* | 3/2012 | Stopniewicz | H04N 21/43637 709/203 |
| 8,311,533 | B1* | 11/2012 | Alcorn | H04B 7/18506 455/431 |
| 8,353,006 | B2* | 1/2013 | Lynch | H04B 7/18506 726/2 |
| 8,396,938 | B2* | 3/2013 | Oscherov | H04L 67/1008 709/217 |
| 8,594,931 | B2* | 11/2013 | Sterkel | B64D 11/0015 701/454 |
| 8,734,256 | B2* | 5/2014 | Sizelove | B64D 11/00155 463/42 |
| 8,762,047 | B2* | 6/2014 | Sterkel | B64D 11/00155 701/409 |
| 8,768,244 | B2* | 7/2014 | Taylor | H04B 7/18508 455/12.1 |
| 8,964,298 | B2* | 2/2015 | Haddick | G02B 27/017 359/630 |
| 9,734,722 | B1* | 8/2017 | Markey | G08G 5/0013 |
| 9,946,076 | B2* | 4/2018 | Smits | H04N 13/356 |
| 10,437,335 | B2* | 10/2019 | Daniels | G06F 3/014 |
| 10,822,108 | B2* | 11/2020 | Chavez | B64C 13/22 |
| 11,760,503 | B2* | 9/2023 | Chavez | G01C 23/00 701/14 |
| 2001/0036822 | A1* | 11/2001 | Mead | H04L 51/38 455/414.3 |
| 2003/0046438 | A1* | 3/2003 | O'Donnell | H04L 29/06 709/250 |
| 2003/0192052 | A1* | 10/2003 | Frisco | G06Q 30/02 725/76 |
| 2006/0095329 | A1* | 5/2006 | Kim | G06Q 30/0269 705/14.58 |
| 2010/0138865 | A1* | 6/2010 | Rai | H04N 7/16 725/44 |
| 2010/0190510 | A1* | 7/2010 | Maranhas | G06Q 10/02 455/456.1 |
| 2010/0191458 | A1* | 7/2010 | Baker | G06Q 30/0207 701/533 |
| 2010/0312586 | A1* | 12/2010 | Drefs | G06Q 10/02 705/5 |
| 2013/0127980 | A1* | 5/2013 | Haddick | G06F 3/013 348/14.08 |
| 2013/0238417 | A1* | 9/2013 | Frelk, Jr. | G06Q 30/0207 705/14.36 |
| 2013/0278631 | A1* | 10/2013 | Border | G06F 3/04842 345/633 |
| 2013/0300637 | A1* | 11/2013 | Smits | G02B 30/26 345/8 |
| 2013/0325640 | A1* | 12/2013 | Morgan | G06Q 30/02 705/15 |
| 2013/0326009 | A1* | 12/2013 | Morgan | G06Q 30/02 709/217 |
| 2014/0297418 | A1* | 10/2014 | Gaur | G06Q 30/0269 705/14.62 |
| 2015/0095073 | A1* | 4/2015 | Li | G06Q 10/025 705/6 |
| 2015/0242765 | A1* | 8/2015 | Muirhead | G06Q 10/02 705/5 |
| 2016/0026253 | A1* | 1/2016 | Bradski | H04N 13/128 345/8 |
| 2016/0360970 | A1* | 12/2016 | Tzvieli | A61B 5/0075 |
| 2017/0263137 | A1* | 9/2017 | Nostry | G08G 5/0047 |
| 2017/0337585 | A1* | 11/2017 | Savoye | H04W 4/12 |
| 2018/0081439 | A1* | 3/2018 | Daniels | G06F 1/163 |
| 2018/0101225 | A1* | 4/2018 | Azmy | B64D 11/00155 |
| 2018/0251230 | A1* | 9/2018 | Chavez | G06F 3/012 |
| 2019/0244252 | A1* | 8/2019 | Hinkins | G06Q 30/0273 |
| 2021/0206507 | A1* | 7/2021 | Chavez | G02B 27/017 |
| 2023/0406533 | A1* | 12/2023 | Chavez | G01C 23/005 |

OTHER PUBLICATIONS

Anne Wainscott-Sargent. Streaming Now: The New Era of In-Flight Connectivity. (May 2017). Retrieved online Dec. 15, 2021. http://interactive.aviationtoday.com/avionicsmagazine/april-may-2017/streaming-now-the-new-era-of-in-flight-connectivity/ (Year: 2017).*

Jonathan Nafarrete. "Qantas First Airline to Offer Virtual Reality Headsets to Passengers." (Jan. 26, 2015). Retrieved online Jul. 29, 2024. https://vrscout.com/projects/qantas-first-airline-virtual-reality-headsets/ (Year: 2015).*

* cited by examiner

MEDIA AND TRAVEL SYSTEM AND METHOD OF USE

BACKGROUND

1. Field of the Invention

The present invention relates generally to travel systems, and more specifically to a travel system with three main components, namely a digital inflight concierge and IFE (in flight entertainment) system, a digital travel planner and advisor system, and a metaverse system. The system of the present invention is configured to extend a traveler's journey into hybrid, virtual, and metaverse worlds to provide a personalized augmented experience for assisting a traveler seamlessly through an end-to-end journey both in the physical world and in a metaverse. The system provides the traveler with a full customizable and personalized experience, giving them more control over their own content and experiences, as well as improving travel-related industries relevancy in the ever-changing digital environment.

2. Description of Related Art

Within the travel industry there are a plurality of areas for improvement. These areas for improvement arise in part due to a segmented disconnect between industry members responsible for a traveler's end-to-end experience. For example, airports and airlines often are not transparent and do not collaborate. Further, travelers have limited control over their experience. Yet further, there is a loss of data and loss of potential alliances that could function to improve the overall travel experience for all players.

One area in which these shortcomings are apparent is with inflight entertainment, wherein each traveler is given the same options for entertainment content and hardware. Accordingly, it is an object of the present invention to provide for a system that improves a traveler's experience by providing for a digital inflight concierge and IFE system.

Another example of these shortcomings is within travel planning. For example, there is currently limited streamlining of travel planning, such as providing a traveler with easy access to ground transportation, flight transportation, and accommodations. This disconnect limits both the traveler's experience and provides for a loss of opportunity for industry members, such as hotels. Accordingly, it is another object of the present invention to provide for a digital travel planner and advisor system that provides for a seamless travel experience.

Yet another example of these shortcomings is limited accessibility for travelers. For example, a traveler may desire to have various travel experiences that are outside of their reach for any number of reasons. Accordingly, it is yet another object of the present invention to provide for a metaverse system that can combine physical and metaphysical worlds to provide a traveler with improved and additional access to travel experiences.

Other travel related shortcomings include a lack of personalization, limited planning, limited offers of complex travel services, choice fatigue, and ignoring of explorers. The present invention provides solutions to address these shortcomings.

The above shortcomings provide for a brief overview of some of the current shortcomings of conventional travel systems, wherein the present invention provides for improvements thereto.

The present invention further provides for additional benefits, namely: (1) the system provides for each user to customize a travel experience; (2) the system provides for an improved business model such that industry players may benefit from revenue sharing agreements, travelers may benefit from reduced fees, and advertisements may provide for improved access and exposure; (3) the system provides for an opportunity for industry players to build stronger relationships with travelers; and (4) the system provides for a metaverse connection to provide a traveler with a virtual and augmented travel experience, wherein the traveler can experience both a combination of physical and metaverse, or strictly a metaverse experience.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1A:
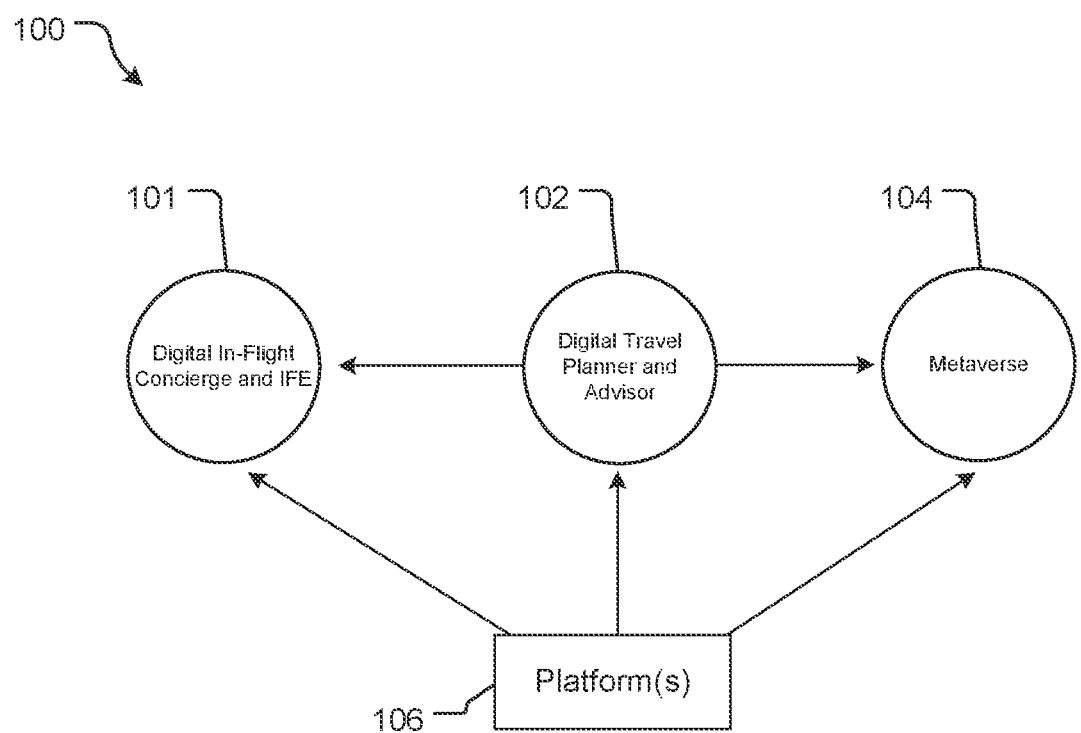
FIG. 1A is diagram depicting three core areas of the media and travel system of the present invention.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional in-flight media systems. Specifically, the present invention provides a means to create ancillary revenue for the airline business, as well as provide for an improved passenger experience. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views.

FIG. 1A depicts a simplified diagram of three core features of the travel system 100 of the present invention. As shown, system 100 at the core includes a digital in-flight concierge and IFE (in-flight entertainment) system 101, a digital travel and planner advisor system 102, and a metaverse system 104. As shown, these core features can be incorporated into a single platform 106 or in some embodiments may utilize multiple platforms.

Figure 1B:
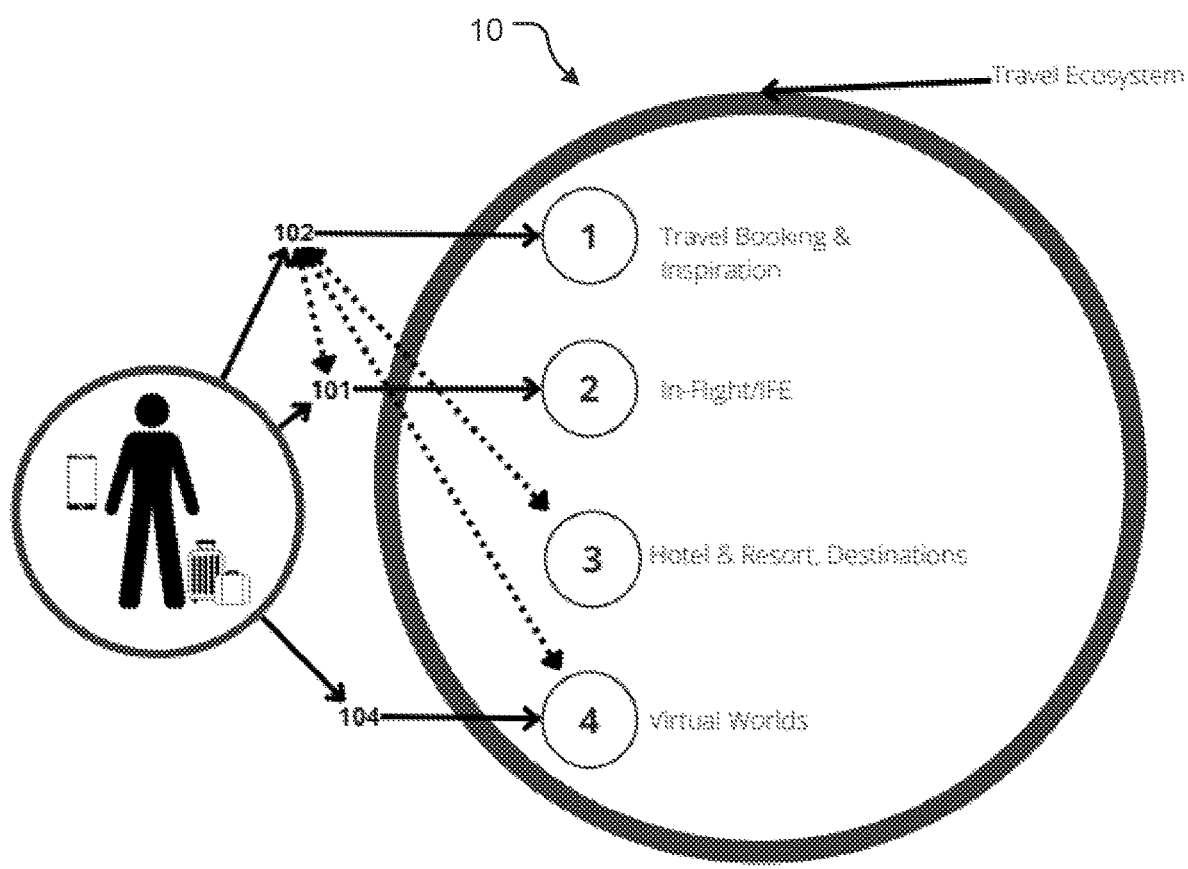
FIG. 1B is a diagram further depicting the incorporation of the three core areas of the media and travel system of the present invention as integrated into a single travel ecosystem.

In FIG. 1B, another simplified diagram depicts the three core features of system 100 as integrated into a travel ecosystem 10 for use by a user. The travel ecosystem 10 incorporates the three core features discussed above, namely the digital in-flight concierge and IFE system 101, the digital travel and planner advisor system 102, and the metaverse system 104. The user being provided with benefits such as (1) travel booking and inspiration; (2) in flight entertainment; (3) hotel, resort, and destination information; and (4) access to virtual worlds.

Figure 1C:
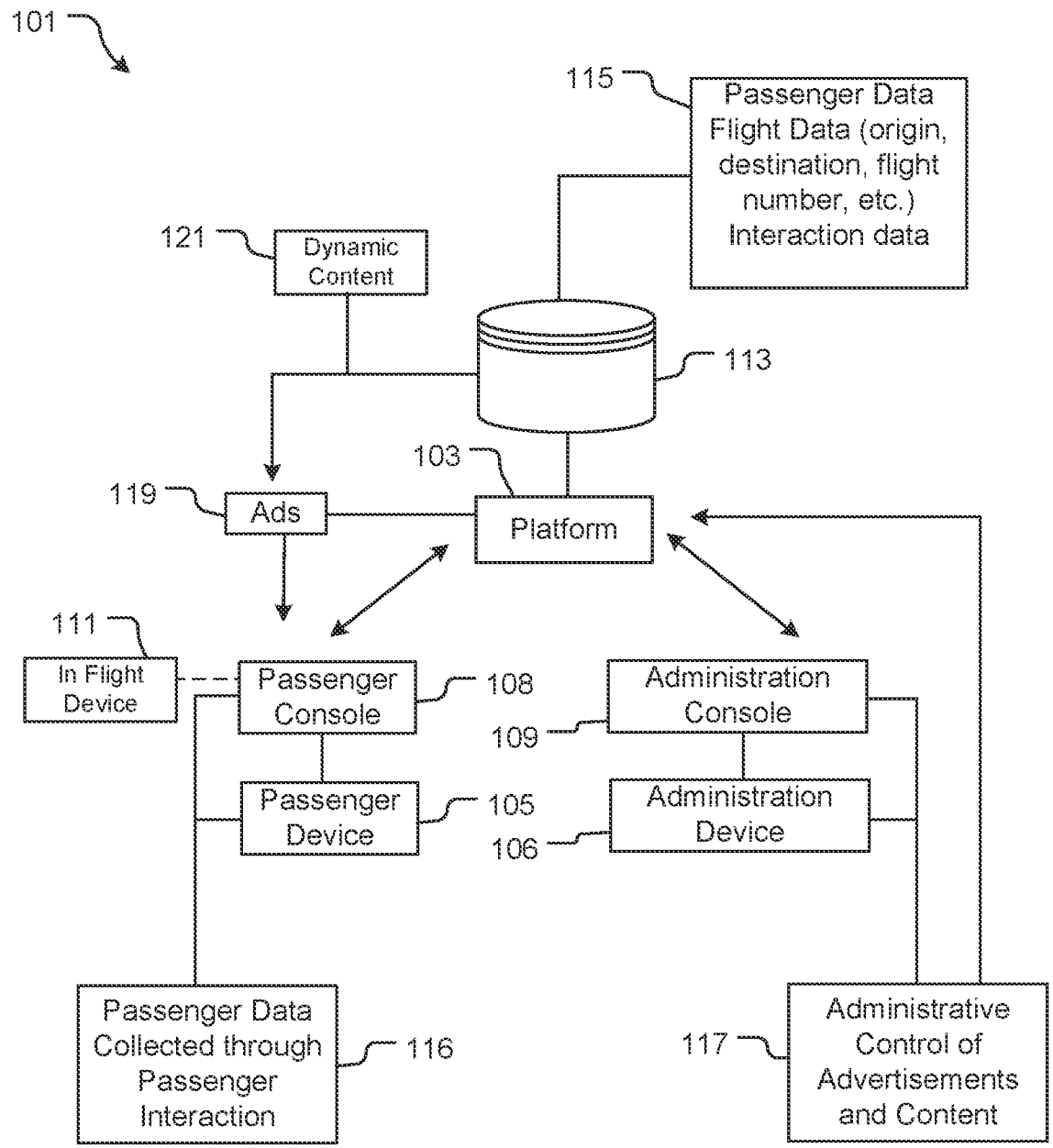
FIG. 1C is a simplified schematic of the media platform system in accordance with a preferred embodiment of the present application.

FIG. 1C depicts a simplified schematic of the features of a digital in-flight concierge and IFE system 101 in accordance with a preferred embodiment of the present application.

The system 101 is primarily designed for the future and modern traveler, digital natives, and nomad travelers, as well as the modern airlines and aircraft operators, hotels, resorts, and transportation (Taxis, Uber®, Lyft®) companies looking for a solution with a streamlined configuration and accelerated delivery process.

In the contemplated embodiment, system 101 includes a media platform 103 being accessible by at least two devices 105, 106, namely at least a passenger device 105 and an administration device 106. The passenger device 105 utilizes a passenger console 108, while the administration device 106 utilizes an administration console 109, as will be discussed herein.

It should be appreciated and understood that the media platform 103 can be incorporated into platform 106 discussed above, or alternatively may be a stand-alone platform.

It should be appreciated that the passenger device 105 and the administration device 106 may correspond to one or more personal computers, laptop computers, personal digital assistants, tablet computers, mobile phones, smart watches, smart glasses, virtual reality and augmented-reality devices, implants, any other smart mobile devices, portable media players, digital media receivers, set-top boxes, kiosks, video game consoles, printers, scanners, any other computing device, or any combination or multiplicity thereof. In other embodiments, the passenger device 105 and the administration device 106 are a computer system such as the exemplary system in FIG.

It should be understood that the passenger device 105 can access the platform 103 at any time, including all stages of flight (e.g., takeoff, airborne, landing, and taxi). Further, it should be appreciated that platform 103 can be accessible via WiFi or another wireless network or may be accessible without requiring a wireless network connection.

In some embodiments, the passenger console 108 is further accessible from an in flight device 111, such as a seat back device. This allows for the passenger to manipulate and utilize the features of the present invention from a variety of avenues. Further, the passenger console 108 will be accessible to the passenger with or without Wi-Fi or internet access (e.g., fixed wireless internet, satellite internet, or the like) and alternatively can use a general-purpose airborne media server. This allows for the passenger to have uninterrupted access with the system during all stages of flight (e.g., takeoff, airborne, landing, and taxi), thereby improving passenger experience. In some embodiments, the system may utilize a third-party provider (e.g., Starlink®, Viasat®, HughesNet®, etc.) to enable uninterrupted access.

The passenger console 108 and administration console 109 will utilize one or more interfaces as will be discussed herein, being designed with the latest user experience technology offering a modern, simple and uncompromised user experience.

The system of the present invention provides for in-flight ancillary revenue and an improved passenger experience, through mobile connected commerce technology. For example, the airline (an administrator) can take control of the relationship with their passengers by adapting to digital, passenger behaviors, and capturing this retail experience of the new era in connected commerce. The system gives passengers the ability to access personalized services and content through their own electronic devices, such as smart phones, tablets, and/or computers, thereby making seat-back or other built-in aircraft monitors obsolete.

The platform 103 is in data communication with one or more servers 113 containing data 115 to apply the current invention. Examples of one or more servers 113 include, without limitation, a web server, an application programming interface (API) request server, a database server, and any combination or multiplicity thereof.

The data 115 will at least include passenger data, such as demographic data, including age, race, and sex. In addition, the data 115 will include flight data, such as an origin, a destination, a flight number, a seat number, etc. In addition, the data 115 will include interaction data that is obtained through the passenger interacting 116 with the passenger console 108 via the passenger device 105. As such, the database 113 and data 115 is constantly changing and evolving based on the collection of data. The platform(s) 103 is configured to utilize the data and provide each user with a customized and personalized experience, including travel recommendations and/or itineraries, as well as advertisements. In addition, the system may be used to calculate unused data, such as, night clubs in Las Vegas, analyzing the popularity of these clubs or establishments—by tracking attendance, social media, and other measurable data. Restaurants, the same thing, gathering and analyzing data of destinations and places of interest for improved and enhanced experiences.

The system of the present invention is configured to allow the administrator, such as an airline, to control advertisements and content 117 that will then be presented to the passenger in the form of advertisements 119. It should be appreciated that one of the unique features of the present invention is that the platform and the database will operate to provide dynamic updates and content 121 for the advertisements 119 based on the data 115.

Accordingly, the content received by the passenger is continuously updated, personalized, and unique for the passenger based on all relevant data. A plurality of advertisement formats may be used as will be shown herein, including smart ads. Further, the system may operate through use of artificial intelligence, machine learning, or other technologies to further customize the content.

The administrator will have a plurality of options to manage the content, including using a tagging system and other flight data, such as airport codes, to designate advertising based on origins and destination, consumer behaviors and preferences, consumer buying behaviors, and the traveler demographics, etc. Further, the ecosystem can leverage rich passenger data from inflight entertainment (IFE) providers so that advertisers can more effectively target potential customers. Passenger-centric analytics enabling the gathering of granular, passenger-specific data will provide a clear view of passenger needs, wants, and behaviors, including travel habits, purchasing histories, personas, and travel plans.

Figure 2:
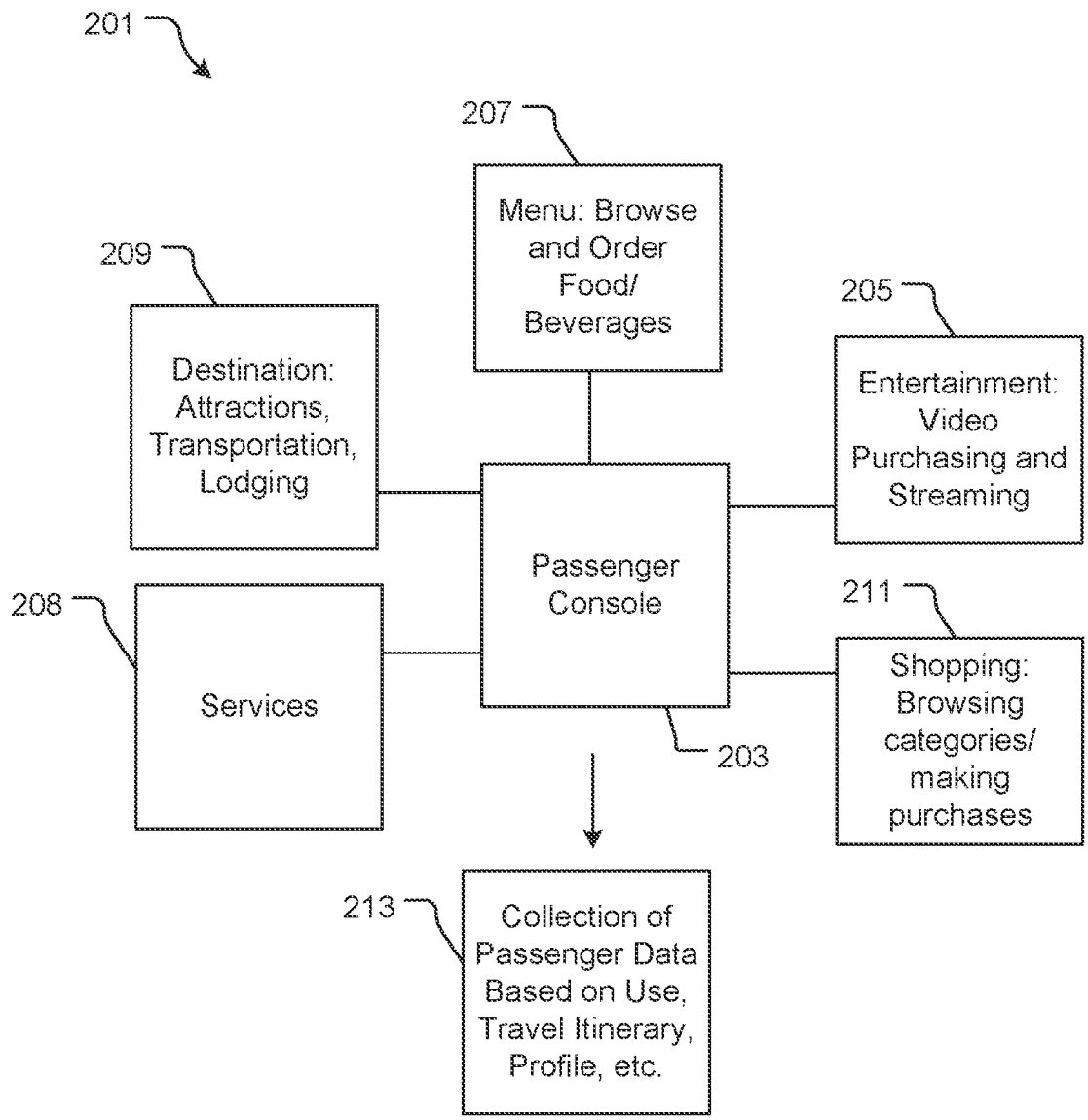
FIG. 2 is a simplified diagram of a passenger portal of FIG. 1.

In FIG. 2, a simplified diagram 201 depicts features of a passenger console 203 in accordance with the present application. The passenger can partake in dynamically changing content through a home page, wherein the passenger can access various menus for making purchases or service arrangements. For example, the passenger may have access to an entertainment menu 205 to make purchases such as videos and the like. The passenger can browse, order, and pay for menu items on a food menu 207. The passenger can browse destination items and services on a destination menu 209 such as transportation, lodging, and attractions. The passenger can shop for products via a shopping menu 211. It should be appreciated that as the passenger uses the platform, data 213 is collected to be used to dynamically update the content.

Figure 3:
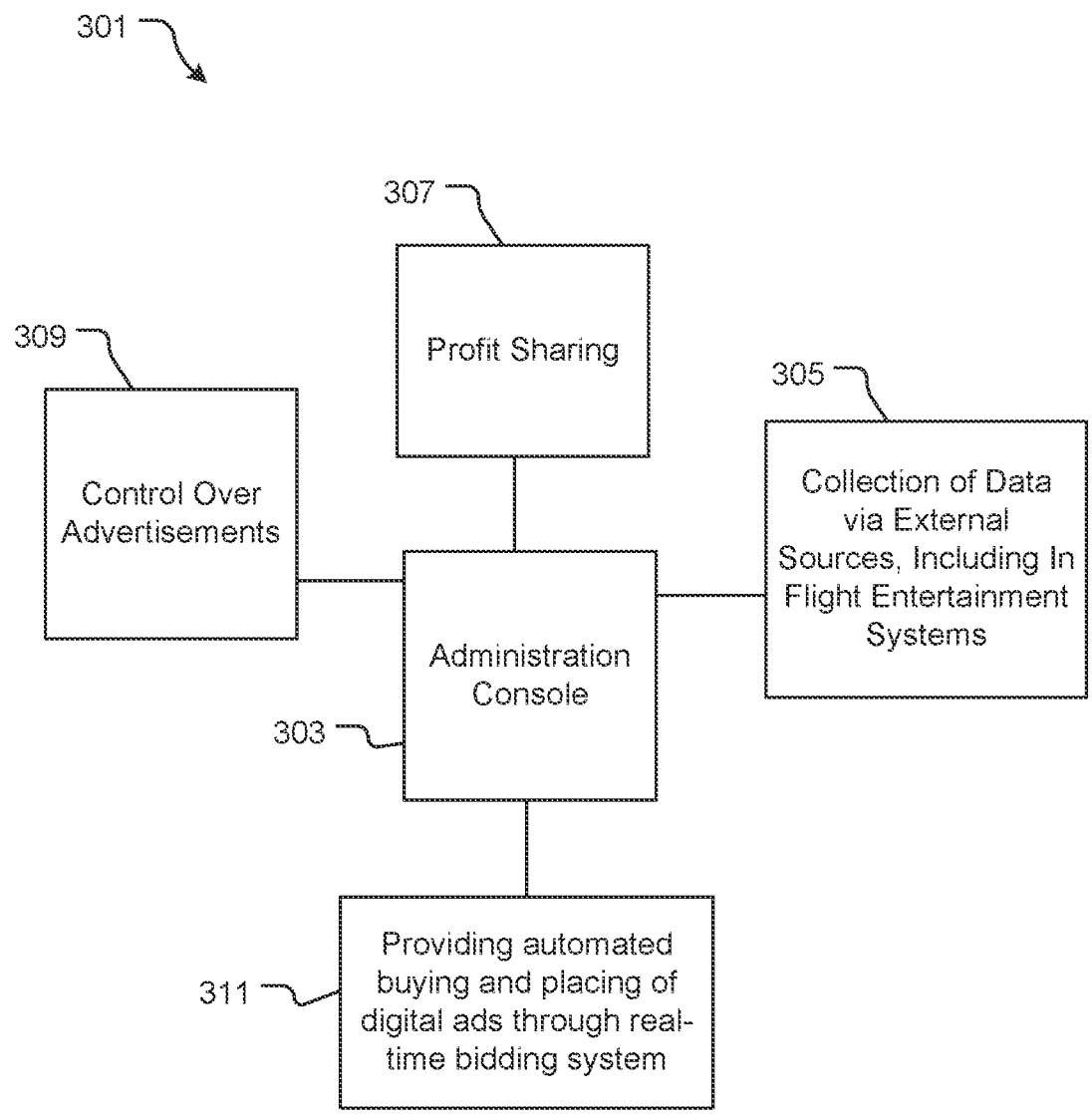
FIG. 3 is a simplified diagram of an administrative portal in accordance with the preferred embodiment of the present application.

In FIG. 3, a simplified diagram 301 depicts a back end/administration console 303 of the platform. Data 305 is collected continuously from one or more sources. Payments are received from passengers, wherein profit sharing 307 provides revenue for airlines, as well as increased return on investments for advertisers. The airline maintains control over advertisements 309. Further, the administration allows for buying and placing of digital ads through real-time bidding systems 311. It should be understood that transactional revenue is generated via in flight purchasing, such as menu items, goods, and entertainment. Ancillary income is generated from advertising dollars, wherein advertisers get improved return on investment (ROI), and revenue is allocated with the airlines.

In some embodiments, the platform allows for administrators to create users and roles for those users, wherein settings allow for the restrictions to be placed on and certain rights to be given to particular users. Further, the platform allows for tracking of analytics and inventory, so that the client knows when particular items (such as a menu item) are low or out of stock. The administrator can then turn off the widget for the particular item.

Figure 4:
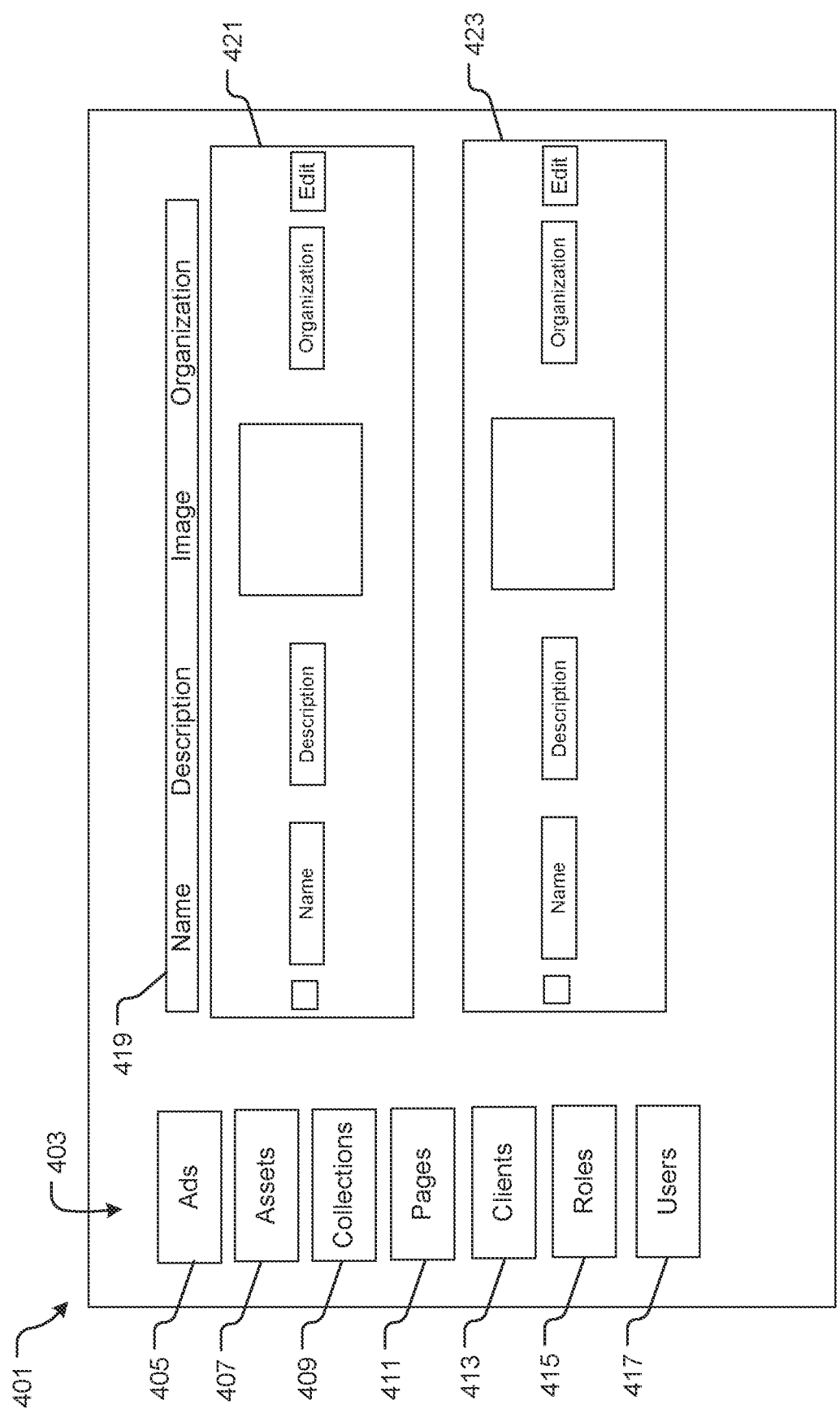
FIGS. 4-8 are a plurality of simplified diagrams of a plurality of interfaces associated with the administration console of the present invention.

In FIG. 4, a simplified diagram depicts a first interface 401 as part of the administration console of the present invention. Interface 401 includes a plurality of selections 403 for the administrator to manage content. For example, the selections 403 may include ads 405, assets 407, collections 409, pages 411, clients 413, roles 415, and users 417. The administrator can utilize the various selections to open a plurality of interfaces, wherein the administrator can manage advertisements and content presented to a passenger. As shown in FIG. 4, an advertisement list is shown with information 419 including a name, a description, an image (or other media file), and an organization. The administrator can select and edit various advertisements from this interface. The list of advertisements may be organized into columns 421, 423 as shown, wherein each column includes the associated information for the advertisement. This allows for easy review by the administrator.

Figure 5:
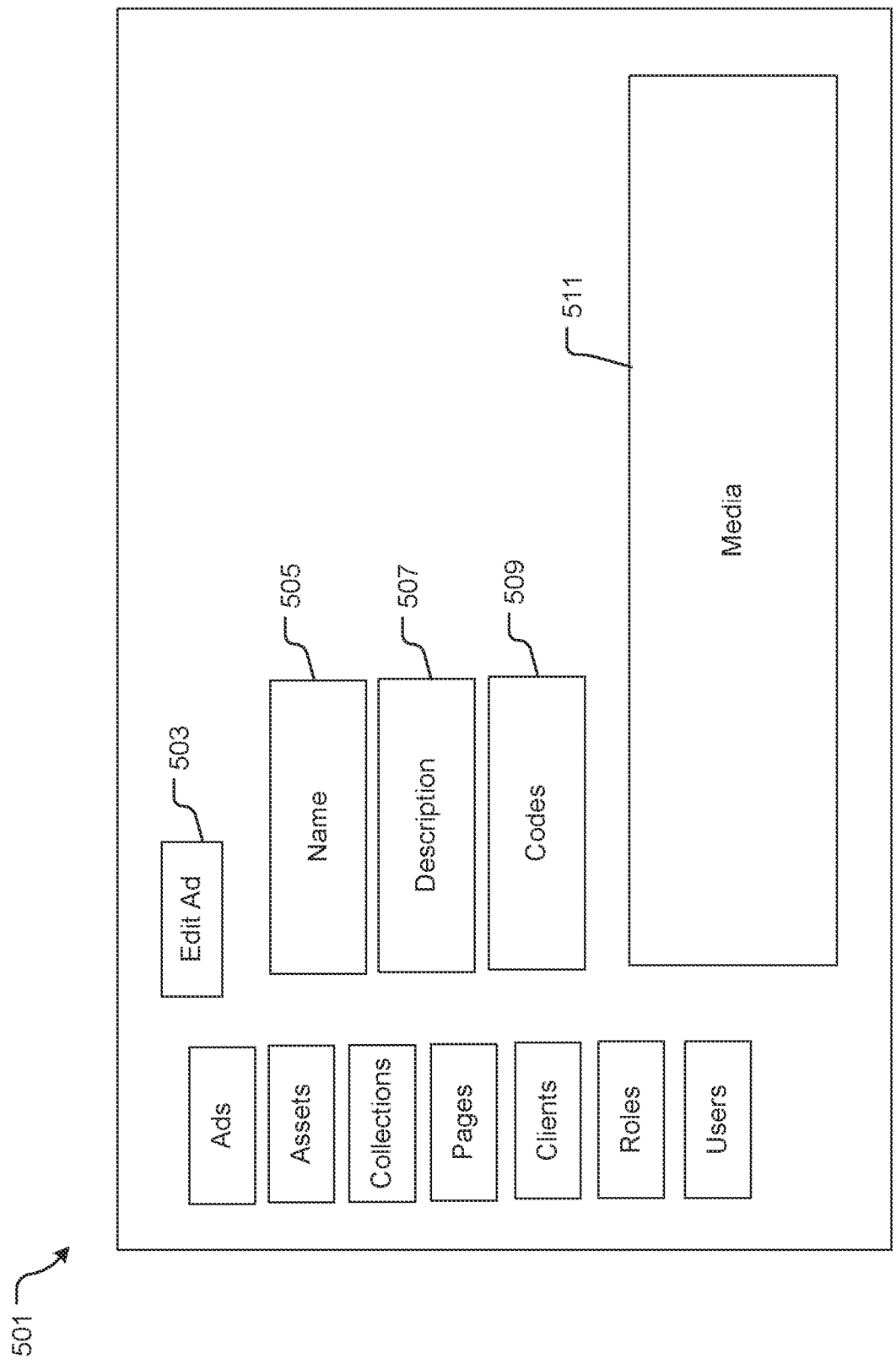

In FIG. 5, another simplified diagram depicts a second interface 501 as part of the administration console of the present invention. The second interface 501 provides for options to allow an administrator to edit 503 an advertisement. The administrator can input a name 505, a description 507, and one or more codes 509 to be associated with that particular advertisement. Further, a media drag-and-drop area 511 may be provided to allow a user to drag images or other media. The input of codes 509 will allow for advertisements to be tagged with information, including airport codes for granular targeting of digital advertising. Further, the administrator may select codes that impact advertisements based on all relevant flight data, including destination, origination, and passenger, from granular to specific seat assignment. This feature is believed novel of the present invention and provides for an improved advertisement system.

Figure 6:
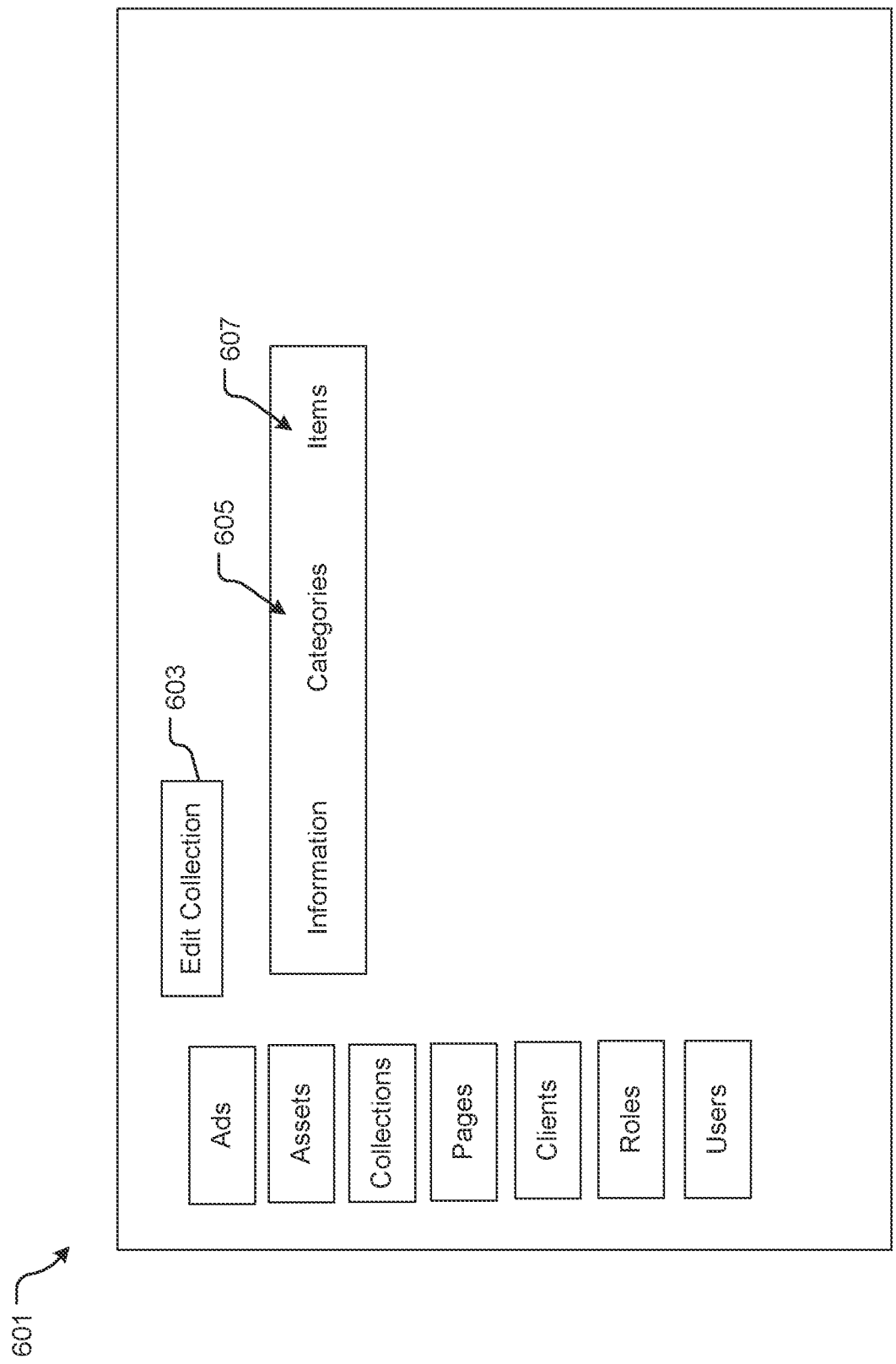

In FIG. 6, another simplified diagram depicts a third interface 601 as part of the administration console of the present invention. Interface 601 provides for editing of a collection 603. A collection in this application includes a category 605 of items, such as, products directed to watches, sunglasses, and other retail products. Further, within each category will be listed specific items 607, wherein the administrator can edit and manipulate specific advertisements. The system of the present invention can track inventory and notify users (administrators) of information such as low quantities or a need to replenish stocks. This feature can function to turn off a particular collection/item of stock from travelers' view in the system.

Figure 7:
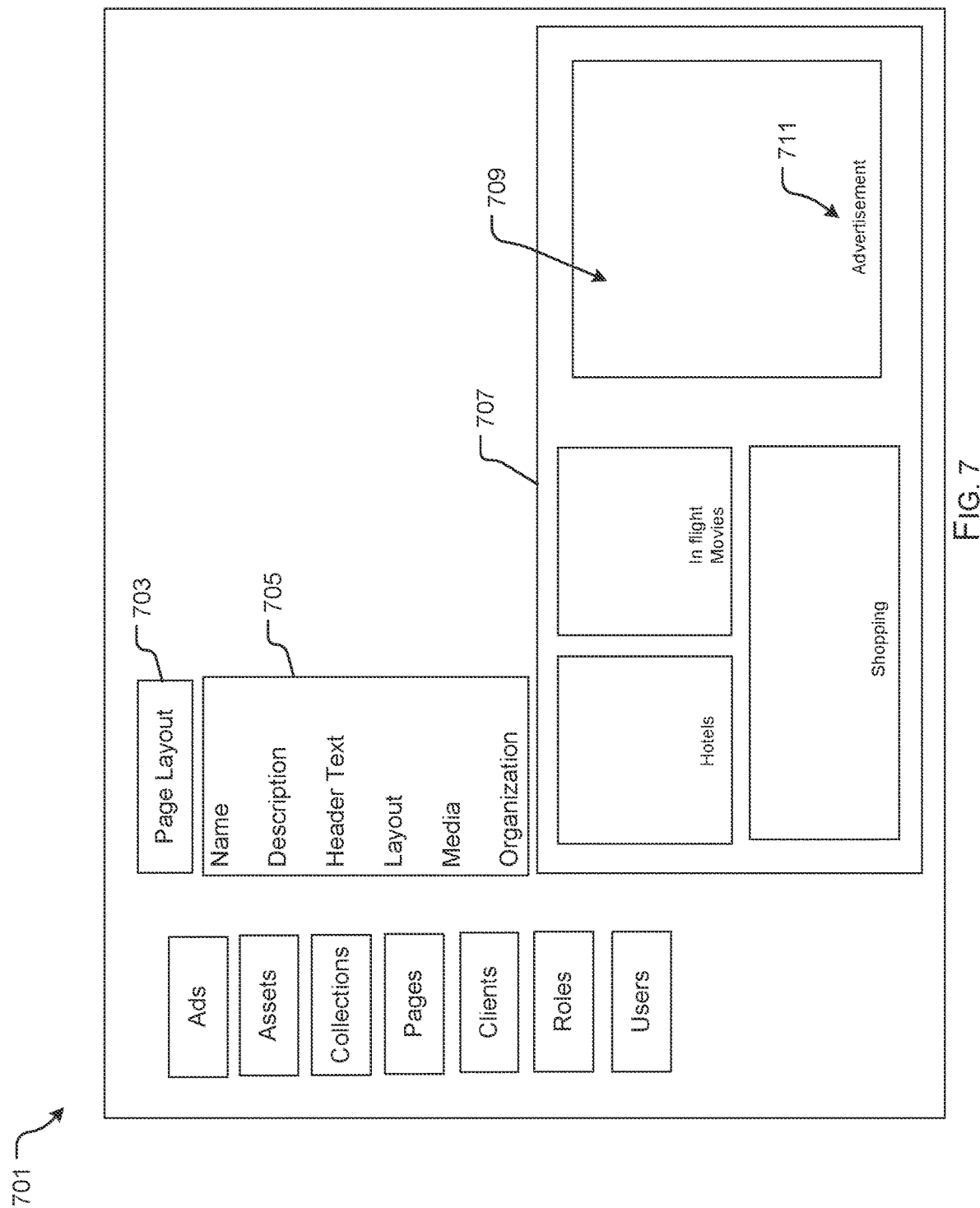

In FIG. 7, yet another simplified diagram depicts a fourth interface 701 as part of the administration console. Interface 701 provides for page layout manipulation 703. As shown, the administrator can edit information 705 for presentation of a page to passengers. Interface 701 further provides a preview 707 of how the page will be presented. The administrator can drag and drop items for customization. As shown, which will be reflected on the passenger console, in the preferred embodiment, the page includes a plurality of tiles, wherein each tile includes a media file 709 and a label 711.

Figure 8:
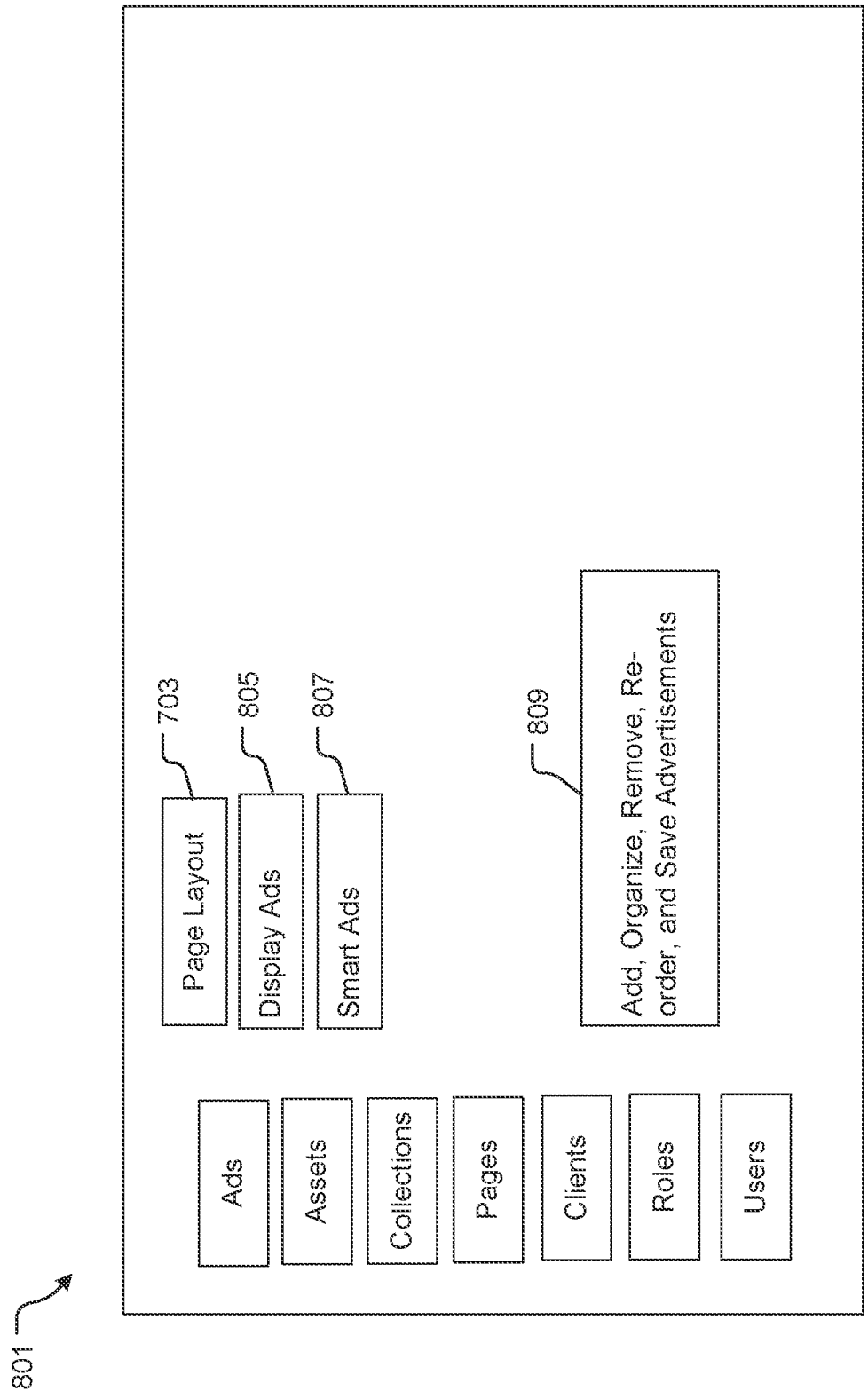

In FIG. 8, another simplified diagram depicts a fifth interface 801 as part of the administration console. Interface 801 further provides for page layout manipulation 703 as the level of individual ads. As shown, the administrator can select a desired order 805, which includes a selection of randomization if desired. The administrator can also select for "smart ads" 807, to allow artificial intelligence to serve up advertisements based on any and all pertaining parameters, such as airport codes, origin city, destination city, time of day, demographics, and passenger behavior. The administrator can overall use this interface to add, organize, remove, re-order, and save advertisements 809.

Figure 9:
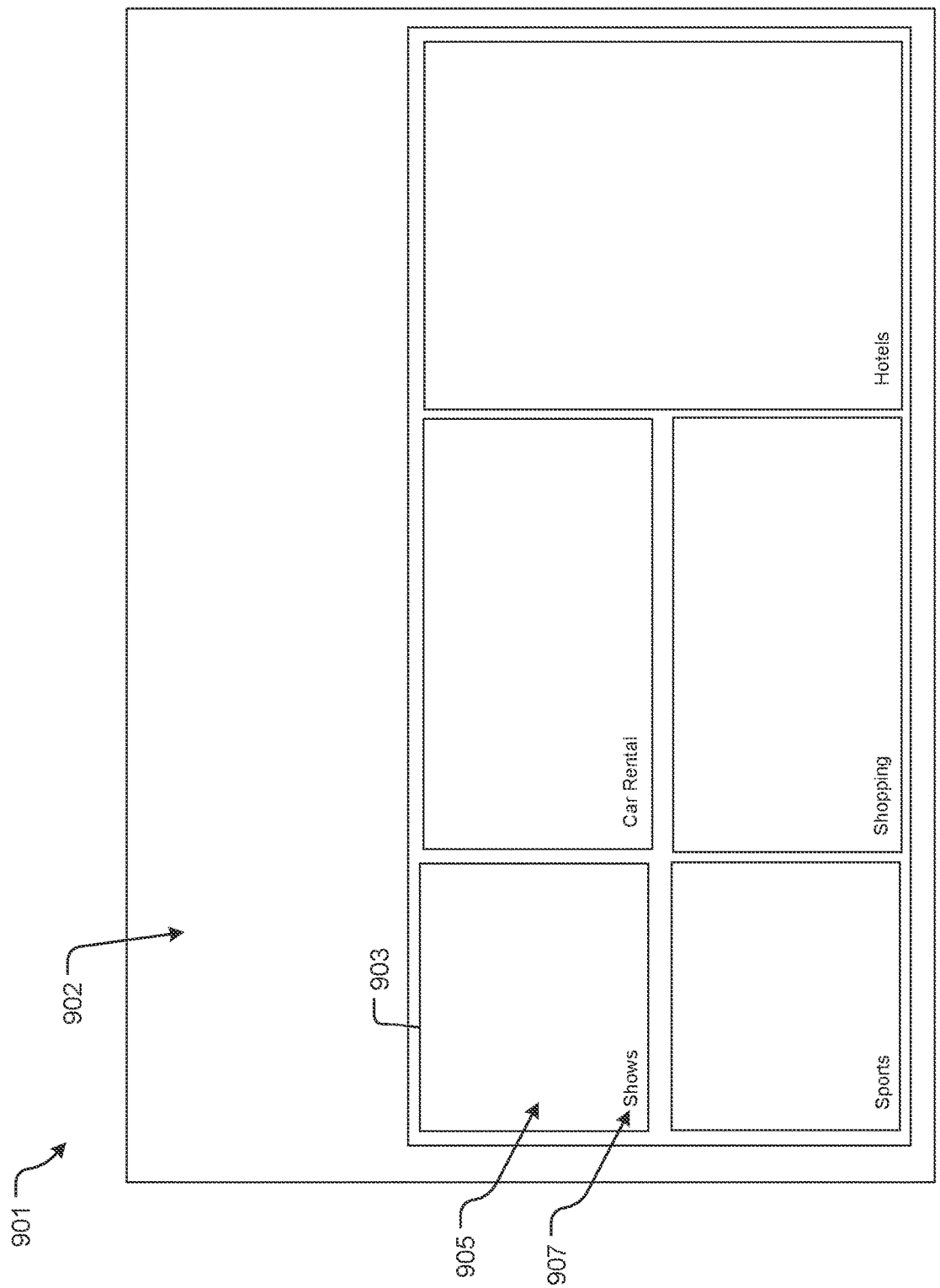
FIGS. 9-11 are a plurality of simplified diagrams of a plurality of interfaces associated with the passenger console of the present invention.
Figure 10:
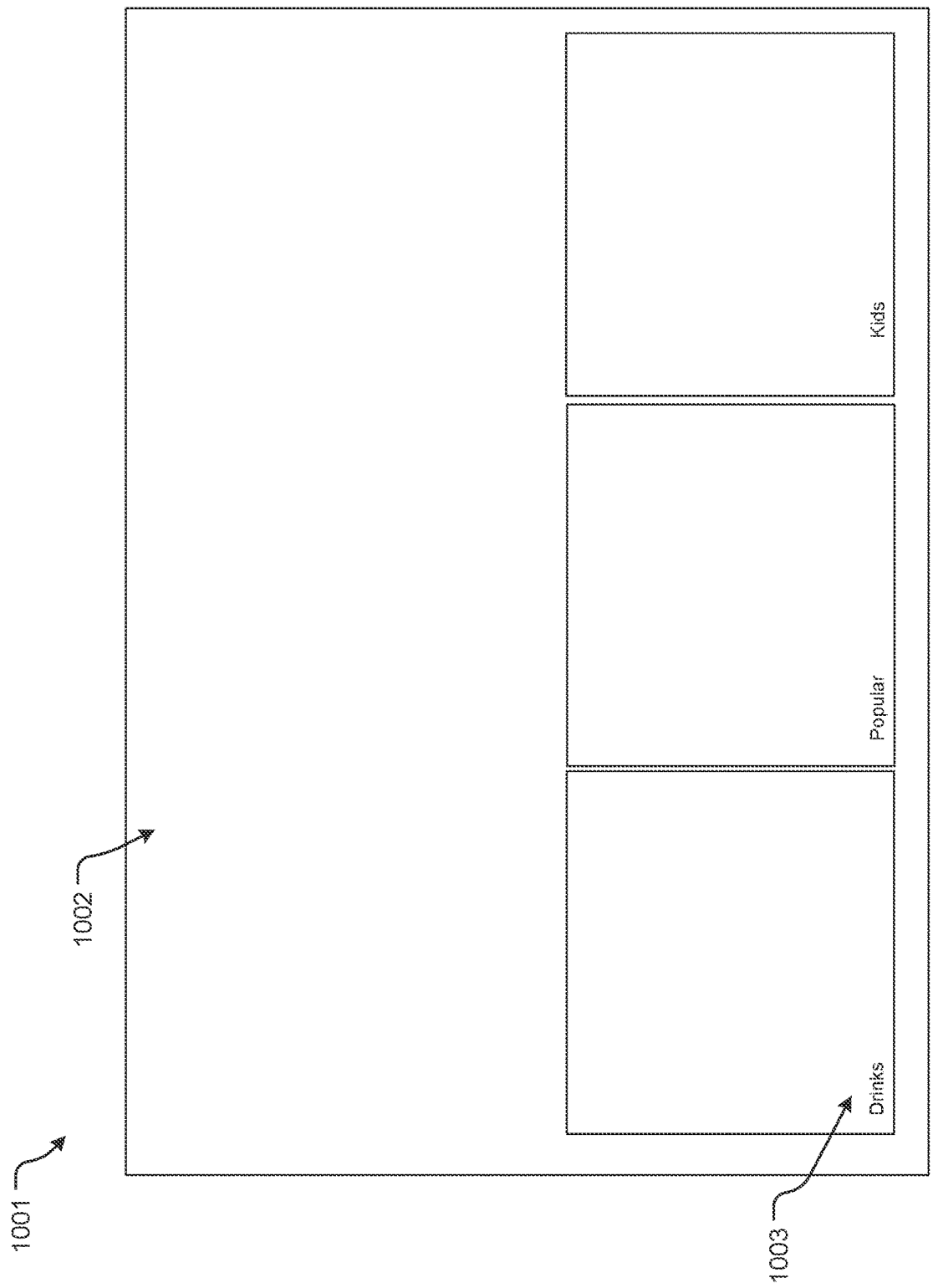
Figure 11:
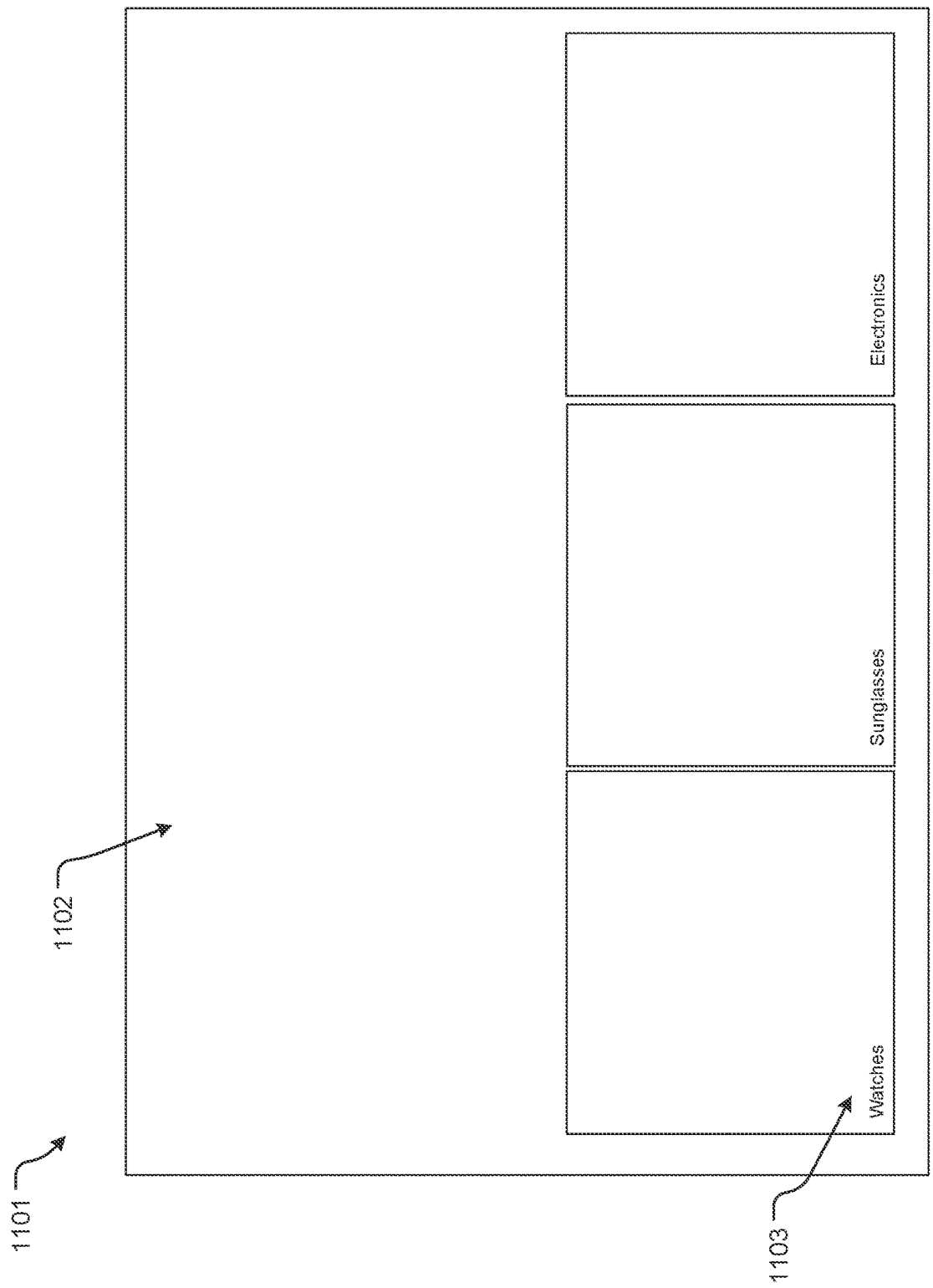

The administrator can utilize the above interfaces, as well as others, to fully control how advertisements are presented to passengers. In FIGS. 9 through 11, the system and method offers a non-abrasive advertising method to consumers-never disrupting their digital pathway or interfering with their digital choices and decision-making process when exploring content and during transitions. A fixed, or sticky header gives increased brand awareness, viewability, and higher impression count.

In FIG. 9, an example of a passenger interface 901 is shown. It should be appreciated that the interface may include additional elements not shown, such as profile icons, cart icons, and the like that are known in the art. The passenger interface 901 in at least some embodiments provides for a video header 902 in which a video advertisement may be played, and plurality of tiles 903, each having a media content 905 such as an image, and further having a label 907. This allows for the passenger to easily navigate to an area of desire, such as entertainment, destination services, and shopping. It should again be appreciated that the passenger interface 901 is dynamically updated based on data as discussed above and further based on administration settings.

In FIG. 10, another interface 1001 from the passenger console is shown. This interface 1001 shows an example of an inflight menu, wherein the passenger can select from various advertised categories 1003, and wherein the passenger can place orders. Again, the content may be dynamically updated and changed. Similarly, in FIG. 11, an interface 1101 shows an example of a page layout with a plurality of categories 1103 such as for shopping. This same layout may be used for various other content, such as entertainment. In FIGS. 10 and 11, video headers 1002, 1102 are provided as similar to the video header 902 of FIG. 9, this provides for a seamless and consistent appearance in all interfaces with the consumer to allow consistent advertising without interfering with the consumers pathway and/or digital decision-making.

Figure 12:
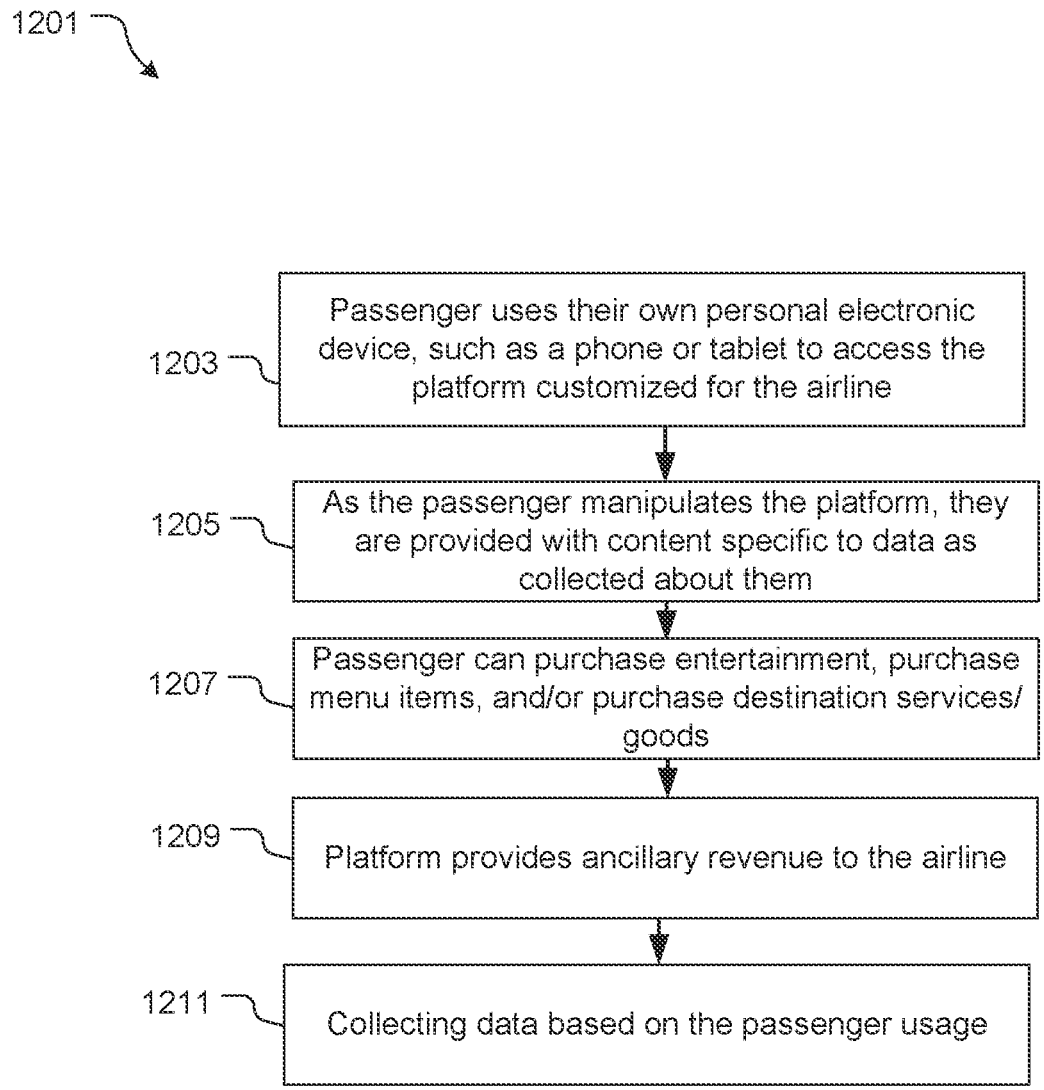
FIG. 12 is a flowchart of the method of use of the system of FIG. 1 from the perspective of the passenger.

In FIG. 12, a first flowchart 1201 depicts the method of use of the system and method from the perspective of the passenger. The passenger uses their own personal electronic device, or a combination of devices, such as a phone or tablet to access the passenger console connected to the platform customized for the airline, as shown with box 1203. As the passenger manipulates the platform, they are provided with content specific to their flight and/or passenger data as collected about them, as shown with box 1205. The passenger can purchase entertainment, menu items, destination services, and goods, as shown with box 1207. Data is continually collected, and revenue is generated, as shown with boxes 1209, 1211.

Figure 13:
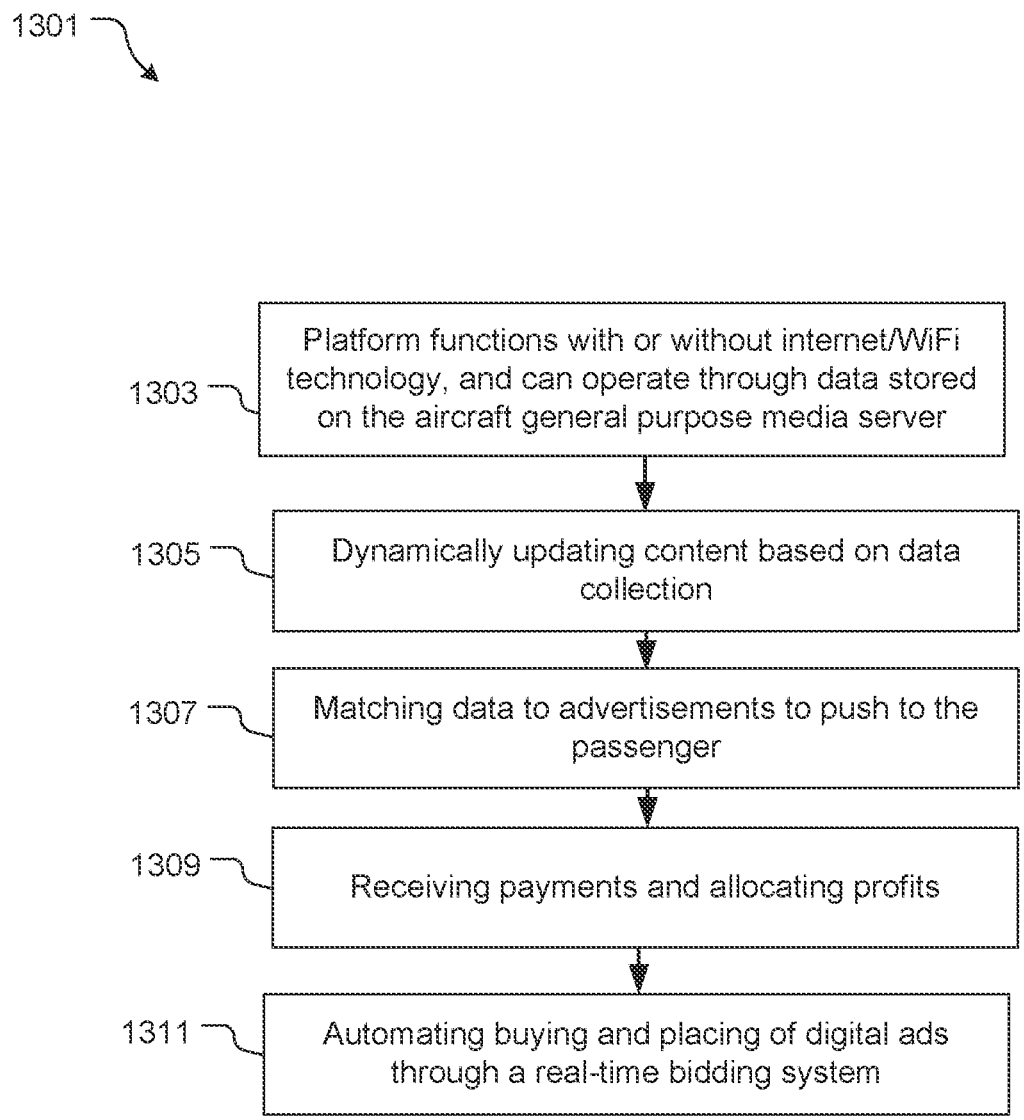
FIG. 13 is a flowchart of the method of use of the system of FIG. 1 from the perspective of administration.

In FIG. 13, a second flowchart 1301 depicts the method of use of the system and method from the administration perspective. The platform functions with or without internet/WiFi technology and can operate through data stored on the aircraft general purpose media server, as shown with box 1303. Content is dynamically updated based on data collection, as shown with box 1305. The data is used to provide tailored content to each user, as shown with box 1307. Payments are received and revenue is distributed, according to profit sharing agreements, as shown with box 1309. Advertisers are provided with automating buying and placing of digital ads through a real-time bidding system, as shown with box 1311. In some embodiments, direct relationships and contractual agreements could be used as opposed to, or with, the real-time bidding system.

Further, "Browser within a browser" web portal for injection of ads, website targeting of ads and custom search ads and further online e-commerce and destination-based transactions. Video advertising trading platform-programmatic advertising to in-transit media markets-offering programmatic advertising in flight without the need for an off-board connection. Programmatic video platform dedicated in-transit media—the system and method allows the automated buying and selling of media on Bring-Your-Own-Device systems in the IFEC and onboard entertainment space, even in disconnected environments. Software-driven algorithms to automate the buying, placing and optimization of digital ads through a real-time bidding system-a marketplace that shares the available ad opportunities on our IFE portal with potential advertisers. Dedicated commerce platform-payment automatically taken from a person's account on third-party wallets.

The product is designed to be bundled online and offline [served via internal servers on planes]. This is achieved by using a lightweight node framework and client segmentation. The platform has a full underlying back end, where each individual client can customize and match collections (categories and items), menus, inventory, video libraries, listings and advertisements to individual flights or aircraft. Advertisements can be pre-set to an "in-order" or "random" play or via "smart ads" technology which can use a tagging system by airport code, aircraft tail #, destination or user IP range. This administration console allows for complete customization for each individual client and flight. Widgets as listed above can be placed into multiple layouts on demand, such as carousel, custom, expanded, stacked card or dynamic layover scroll, where a video or advertisement can play behind rows of items, or in a dedicated video ad space, within interscroller formats, etc. All views are responsive and dynamic. The menus which can be differentiated for each client/plane/etc., specifically the custom layout which is built upon a page layout creator or screen editor where clients can drag and drop what they desire and even determine the size of individual widget cards on the main menu. This process is dynamic and can be changed on demand. The product is designed to be updated in real time or when the plane is on the ground.

It should be appreciated that one of the unique features believed characteristic of the present application is the platform has the capability to provide aircraft operators, airlines, passengers and content providers with the full potential of a digitally connected aircraft and increase ROI and ancillary revenues-without the excessive costs associated with other suppliers. The platform and system provide opportunities to reach guests and passengers with curated, mixed content and seamless advertising integration including promotions, targeted offers and destination content from content providers. The platform comes with all the essentials and is delivered with a set of key applications and digital services to meet airline and passenger expectations. The platform does not require STC or other compliance from the FAA and enables immediate ancillary revenue, deliverable and packaged aboard certified and compliant general airborne or media servers and is connectivity ready. Further, predefined seat pairings have been established while offering LOPA flexibility. The platform is designed to enable passengers to connect, engage, and enjoy their flight with the latest consumer electronic devices and unique connected apps. Systems are powered by the platform to continually enhance guest and passenger engagement and personalization through their travel journey.

It should be appreciated that although the preferred embodiment discussed herein is directed toward inflight travel, the system can easily be adapted to other industries, including hotels and resorts. For example, the user computing device could be a TV or LCD monitor in a hotel room, in which the platform is accessible, and the user thereby engages in digital marketing, ads, making reservations, ordering transportation service, etc. In the transportation industry, the system can include the computing device being incorporated into the transportation vehicle, such as a tablet located in the vehicle for engagement with the passenger. It should be appreciated that this allows for use of the system for an entire travel experience.

Figure 14:
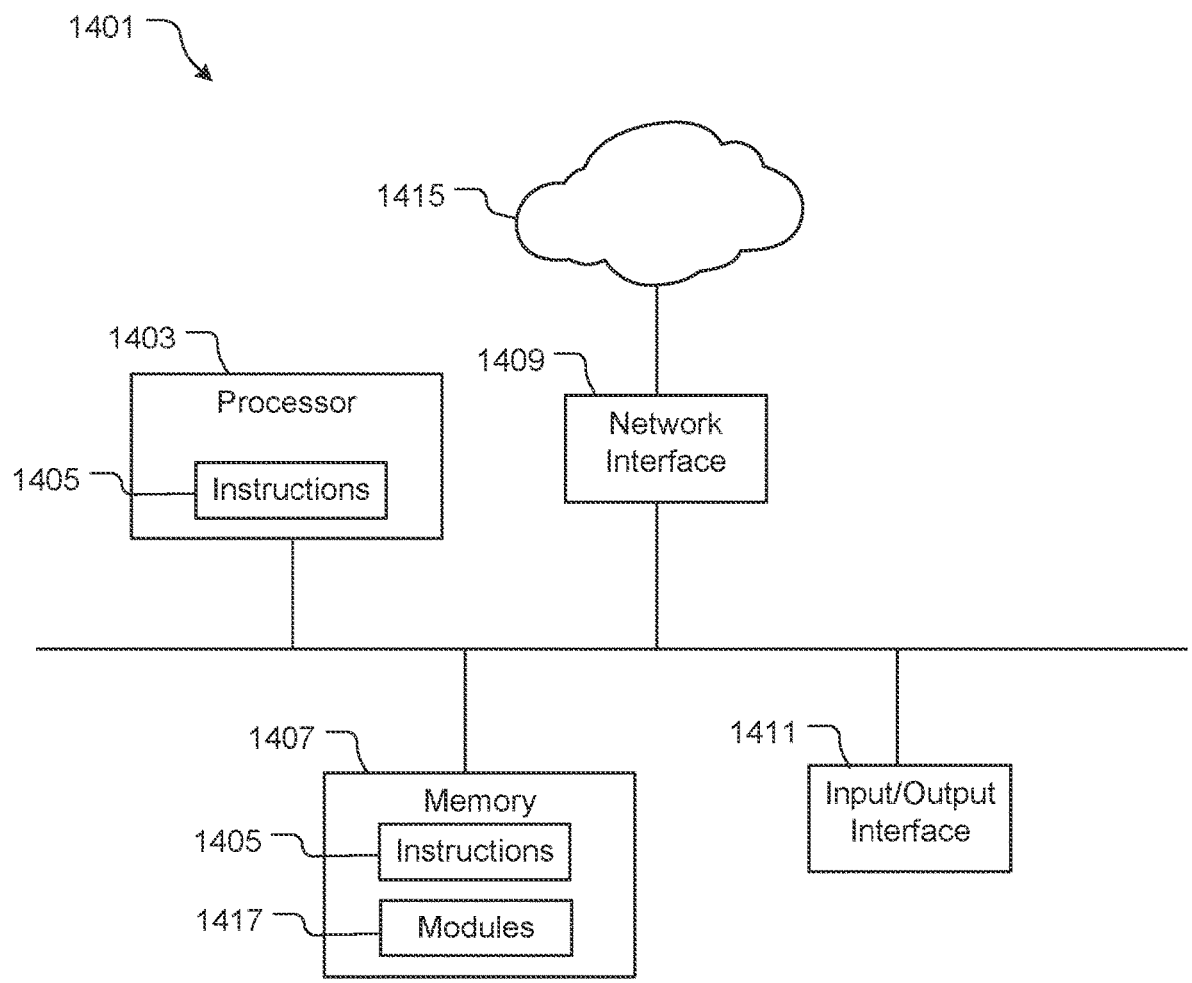
FIG. 14 is a block diagram illustrating an example computer system within with a set of instructions for causing a machine to perform any one or more of the methodologies discussed herein may be executed.

Referring now to FIG. 14, a block diagram of a computer system 1401, within which a set of instructions may be executed for causing a machine to perform any one or more of the methodologies discussed herein, is depicted. The computer system 1401 may correspond to any of the various computing devices, servers, mobile devices, embedded systems, or computing systems presented herein.

The computer system 1401 may be implemented as any of a variety of conventional computing devices, including, for example, a desktop computer, a laptop, a tablet, a phablet, a workstation, an embedded controller, a server, a mobile device, a smartphone, an entertainment device, a printing machine (also referred as a printer or a printing device), a set-top box, a kiosk, a vehicular information system, one or more processors associated with a television, a customized machine, any other hardware platform, or any combination or multiplicity thereof. The computer system 1401 may be a distributed system configured to function using multiple computing machines interconnected via a data network or bus system. Further, while only a single machine is illustrated, the term "machine" shall also be taken to include any collection of machines that individually or jointly execute a set (or multiple sets) of instructions to perform any one or more of the methodologies discussed herein.

The computer system 1401 includes at least one processor 1403 with or without one or more sets of instructions 1405, a memory 1407 with or without one or more sets of instructions 1405, a network interface 1409, and an input/output interface 1411 which communicate with each other via a bus 1413.

The processor 1403 may be configured to execute code or instructions to perform the operations and functionality described herein, manage request flow and address mappings, and to perform calculations and generate commands. The processor 1403 may be configured to monitor and control the operation of the components in the computer system 1401. The processor 1403 may be a general-purpose processor, a processor core, a multiprocessor, a reconfigurable processor, a microcontroller, a digital processor (DSP), an application specific integrated circuit (ASIC), a graphics processing unit (GPU), a field programmable gate array (FPGA), a programmable logic device (PLD), a controller, a state machine, grated logic, discrete hardware components, any other processing unit, or any combination or multiplicity thereof. The processor 1403 may be a single processing unit, multiple processing cores, special purpose processing cores, co-processors, or any combination thereof. In addition, the processor 1403 along with other components of the computer system 1401 may be a virtualized computing machine executing within one or more other computing machines.

The processor 1403 may also be connected to the other elements of the computer system 1401 or the various peripherals discussed herein through the bus 1413. It should be appreciated that the bus 1413 may be within the processor 1403, outside the processor 1403, or both. In some embodiments, any of the processor 1403, the other elements of the computer system 1401, or the various peripherals discussed herein may be integrated into a single device, for example, a system on a chip (SOC), system on package (SOP), or application-specific integrated circuit (ASIC) device.

The instructions 1405 may reside, completely or at least partially, within the processor 1403 and/or memory 1407 during execution thereof by the computer system 1401. The instructions 1405 may include directions for storing instructions, performing one or more functions, and the like. For example, the instructions 1405 may include detecting one or more files to perform one or more methodologies described herein. The instructions 1405 may be configured to run in sequential order, in parallel (such as under different processing threads) or in a combination thereof. The instructions 1405 may further be transmitted or received over a network 1415 using a transmission medium, for instance network interface 1409, and any one of a number of well-known transfer protocols (e.g., HTTP, HTTPS, FTP, TCP, and the like).

The network interface 1407 facilitates communication with other computing systems (not shown) via one or more networks 1415. Other computing systems, for example, may include conventional computing devices as described above, internet connected devices/systems, or an external storage such as a server, or a cloud computing system.

The computer system 1401 may operate in a networked environment using logical connections through the network interface 1409 to one or more other systems or computing machines across the network 1415. The network 1415 may include wide area networks (WAN), local area networks (LAN), the Internet, intranets, wireless access networks, wired networks, mobile networks, telephone networks, near field communication (NFC), optical networks, or combinations thereof. The network 1415 may be packet switched, circuit switched, of any topology, and may use any communication protocol. Communication links within the network 1415 may involve various digital or analog communication media, for example, fiber optic cables, free-space optics, waveguides, electrical conductors, wireless links, antennas, radio frequency communications, and the like.

The memory 1407 may include volatile memories, for example, random-access memory (RAM), static random-access memory (SRAM), dynamic random-access memory (DRAM), and synchronous dynamic random-access memory (SDRAM). Other types of RAM also may be used to implement the memory 1407. The memory 1407 may also include non-volatile memories, for example, read-only memory (ROM), erasable programmable read-only (EROM), flash memories, or any other device capable of storing program instructions or data with or without applied power. In addition, the memory 1407 may include a non-volatile storage device, for example, a hard disk, a floppy disk, an optical disk, a compact disk read only memory (CD-ROM), a digital versatile disc (DVD), a Blu-ray disc, a magnetic tape, a flash memory, other non-volatile memory device, a solid state drive (SSD), any magnetic storage device, any optical storage device, any semiconductor storage device, any physical-based storage device, any other data storage device, or any combination or multiplicity thereof.

The memory 1407 may also include one or more modules 1417 configured to facilitate the computer system 1401 with performing the methodologies described herein. The module 1417 may include one or more sets of instructions 1405 stored as software or firmware in association with the memory 1407. The memory 1407 may therefore represent examples of machine or computer readable media on which instructions or code may be stored for execution by the processor 1403. Machine or computer readable media may generally refer to any medium or media used to provide instructions to the processor 1403. Such machine or computer readable media associated with the module 1417 may comprise a computer software product. It should be appreciated that a computer software product comprising the module 1417 may also be associated with one or more processes or methods for delivering the module 1417 to the computer system 1401 via the network 1415, any signal-bearing medium, or any other communication or delivery technology. The module 1417 may also comprise hardware circuits or information for configuring hardware circuits, for example, microcode or configuration information for a FPGA or other PLD.

The input/output (I/O) 1411 may couple the computer system 1401 to various input devices including keyboards, mice, touchscreens, touchpads, trackballs, joysticks, cameras, microphones, scanners, electronic digitizers, sensors, receivers, wireless remotes, and any other pointing devices, or any combination thereof. The I/O 1411 may couple the computer system 1401 to various output devices including video displays, speakers, printers, projectors, tactile feedback devices, automation control, robotic components, and the like.

Figure 15:
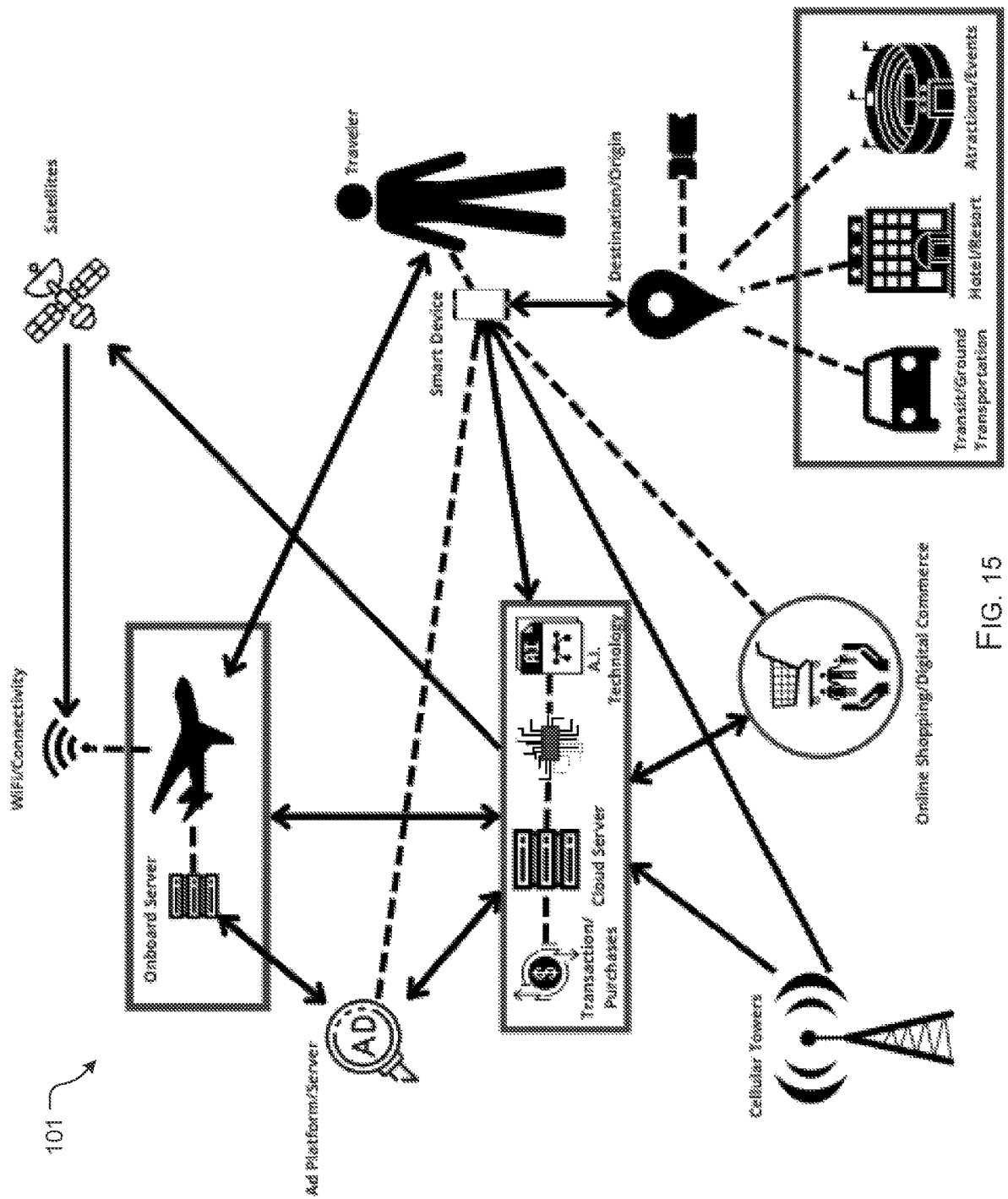
FIG. 15 is a schematic of the features of a digital in-flight concierge and IFE of the present invention.

FIG. 15 depicts another schematic of the digital in-flight concierge and IFE system 101 for clarity. As shown, the user will utilize a smart device for connections to one or more platforms as discussed above for digital inflight entertainment and concierge services. This includes connections to destination services, such as ground transportation, UAV services, drone taxis, accommodations, events and attractions. In addition, the user will have connections to online shopping and digital commerce and receiving of advertisements, including updates, discounts, and geo-targeted marketing based on position and location. Further, the system will provide for in-flight connections through various technology, including Wi-Fi and satellites. Yet further, the system will implement operations with cellular towers and can utilize one or more servers and AI technology.

Figure 16:
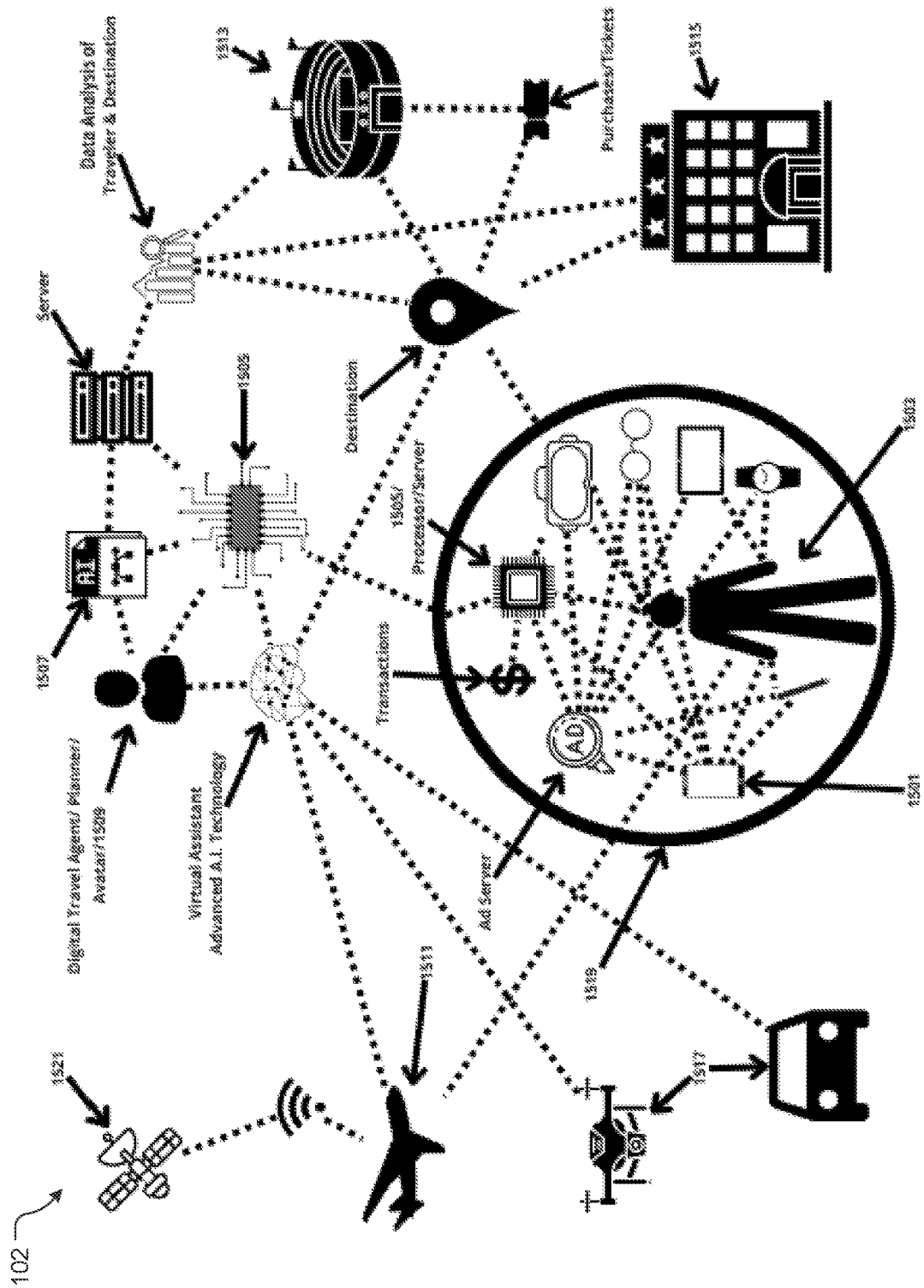
FIG. 16 is a schematic of the features of a digital travel and planner advisor system of the present invention.

FIG. 16 depicts a schematic of the second core feature of the present invention, namely the digital travel planner and advisor system 102 of the present invention. As discussed above, system 102 can include one or more platforms 1519 which may be a standalone platform or combined in a single platform with the digital in-flight concierge and IFE platform and metaverse platform (discussed below). The travel advisor system 102 includes one or more devices 1501, which may be any of the devices discussed above, the device 1501 providing a user 1503 with access to the travel advisor platform 1519. As shown, the travel advisor platform 1519 may utilize artificial intelligence 1507 and one or more processors 1505 to provide the user with an improved travel experience, including providing the user with a digital travel advisor and virtual avatar 1509. This system can use any of the features discussed above, including the collection of data such as personal data and travel data, to provide the user with a travel itinerary through the digital travel advisory, such that the user is provided with a step-by-step travel experience.

Through the implementation of the travel advisor platform 1519, the user can organize, utilize their own content, and plan their own in-flight entertainment, use their own services, third-party streaming services, such as Netflix®, Hulu®, etc. 1511, plan, purchase, setup, and execute travel and media entertainment for on the ground 1513, such as concert tickets, make accommodation reservations 1515, and order transportation services 1517. The system and method plan all aspects of the travel journey, including monitoring incoming, outgoing, and real-time data from multiple sources—to help advise travelers on better and more sound travel options and decisions, planning everything on their behalf, and therefore functioning as a digital travel agent. The system is always with the user for the duration of the trip or journey, always available, always informing and assisting the user, while being proactive and engaging, as well as influencing decisions based on current locations, geo-targeting, and determination of nearby deals/discounts. System 102 can work in combination with system 101 for in-flight entertainment purposes as well as an entertainment solution/system during the other areas of the travel journey—in hotel rooms, etc. This entertainment system is planned via 102 during the establishment of their travel itinerary or planning-another piece of the overall travel experience. For example, 102 plans accommodations, flight, transportation services, entertainment for both inflight and both pre-flight and post-flight.

Further, the user can implement use of various secondary devices such as smartwatches, micro/nano chips, glasses, and other devices for augmentation of entertainment and the travel experience. The operation of these various other devices can provide the user with an experience of a metaverse, a hybrid world (combination of both physical and virtual worlds) as shown in FIG. 1A, wherein the user can blend the physical world with a digital world to experience travel, virtual-realities, augmented-realities, gaming, and immerse themselves into these realities and digital worlds. The system 102 can also utilize low orbit satellites 1521 to provide for communication operations.

Figure 17:
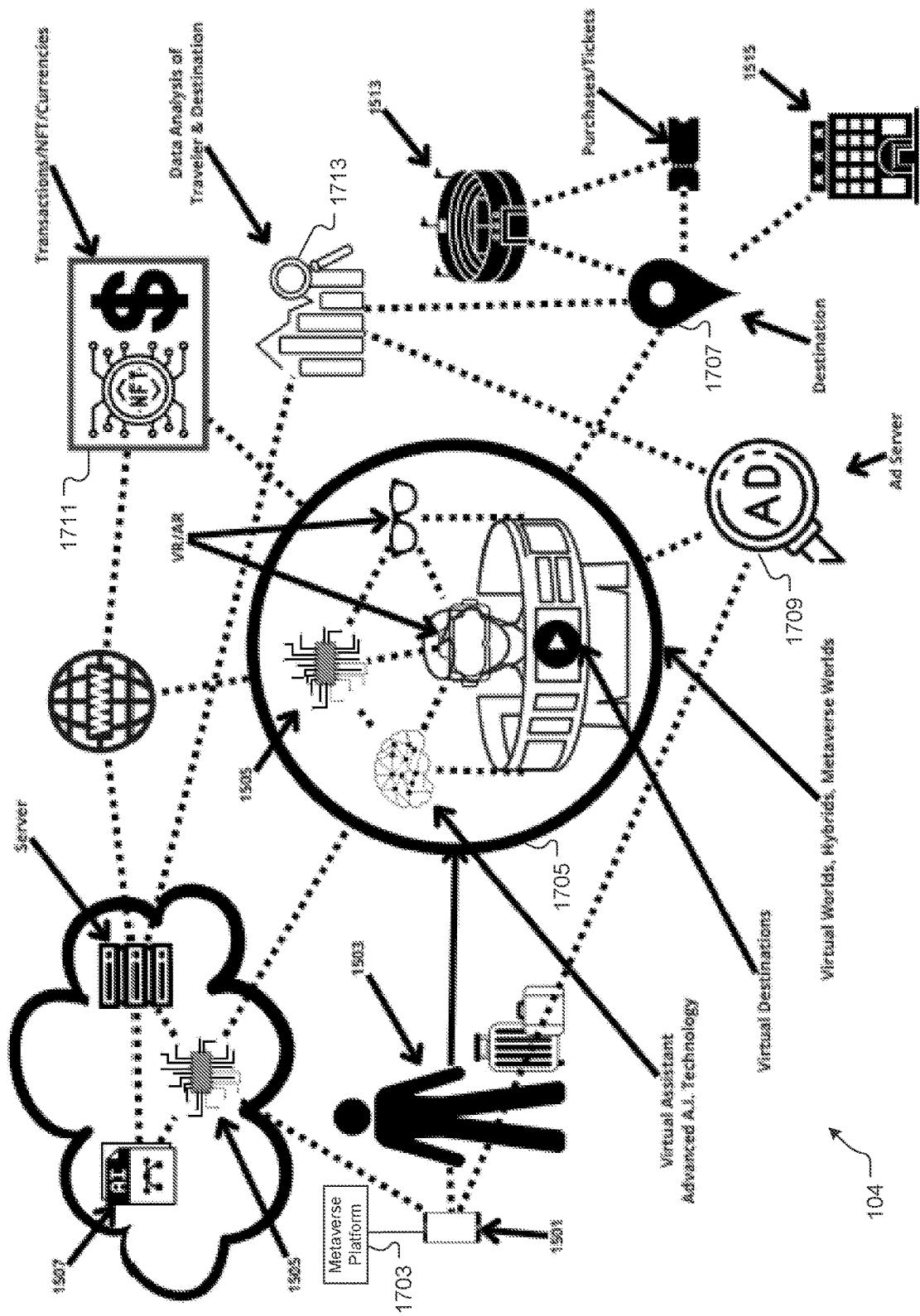
FIG. 17 is a schematic of features of a metaverse system of the present invention.

In FIG. 17, a schematic further depicts the features and operation of the metaverse system 104 of the present invention. As shown, the user 1503 will utilize device 1501 for access to a metaverse platform 1703. Again, as discussed above, the metaverse platform may be combined with platforms 1507 and platform 103 into a single platform, or alternatively all three may be standalone and utilized separately.

The user can utilize various AR/VR devices in combination with the platform 1703 for experiences that utilize a metaverse world 1705. As shown, the user will utilize the platform 1703 for a plurality of activities, including some or all of the activities discussed above in connection with system 101 and 102 depending on the embodiment of the present invention. As shown, the user can experience travel such as discussed above by having access to the features of the digital inflight concierge and IFE (in flight entertainment) system and a digital travel planner and advisor system, but in a metaverse/virtual/hybrid world 1705. This allows for a user to have a unique travel experience from a convenient and distant location.

For example, if a user wants to visit the great wall of China, but is unable to physically travel there or afford the trip, the user could travel via the metaverse system 104 virtually, using the platform 1703, one or more VR/AR devices, and the network, wherein the user would then have a similar experience as if they were physically in China. They can use the system to visit destination attractions 1707, see ads 1709, play music, connect with others, use BitCoin 1711, go to a concert 1513 while there, make in app purchases and upgrades via digital and token-type currencies, and essentially travel virtually anywhere and any time. Another example would be if the user was able to physically travel to a location, such as China, but is unable to physically visit all attractions, such as the "Great Wall", they can use system 104 to virtually experience the attractions.

System 104 will also collect and analyze traveler data 1713 for improvement of the system as discussed above.

Figure 18:
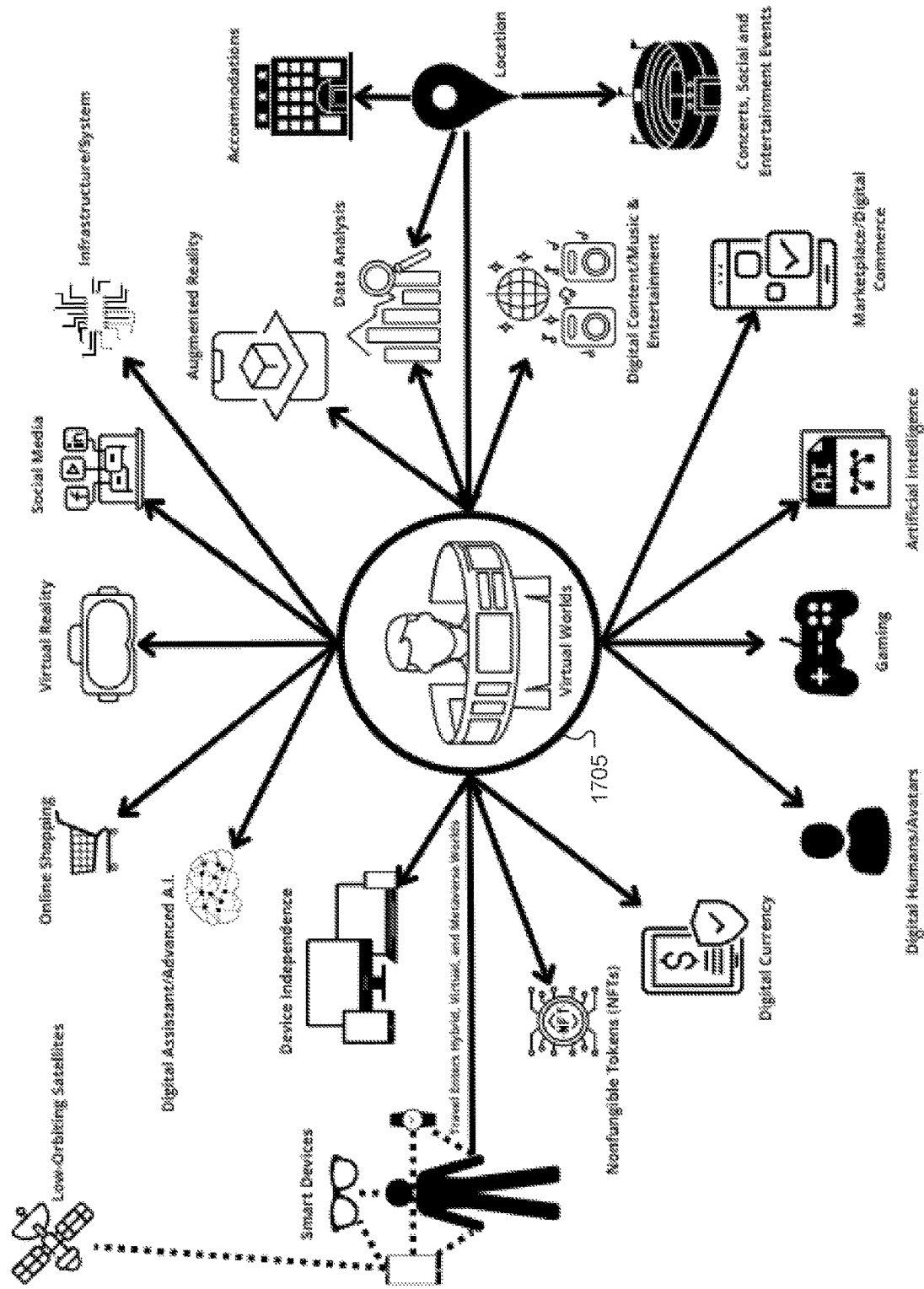
FIG. 18 is another schematic of features of a metaverse system of the present invention.

In FIG. 18, another schematic depicts the technology utilized for the system 104. As shown, the metaverse system 104 will integrate a plurality of hardware and software devices to provide the user with the best travel experience in a metaverse/hybrid/virtual world 1705.

Figure 19:
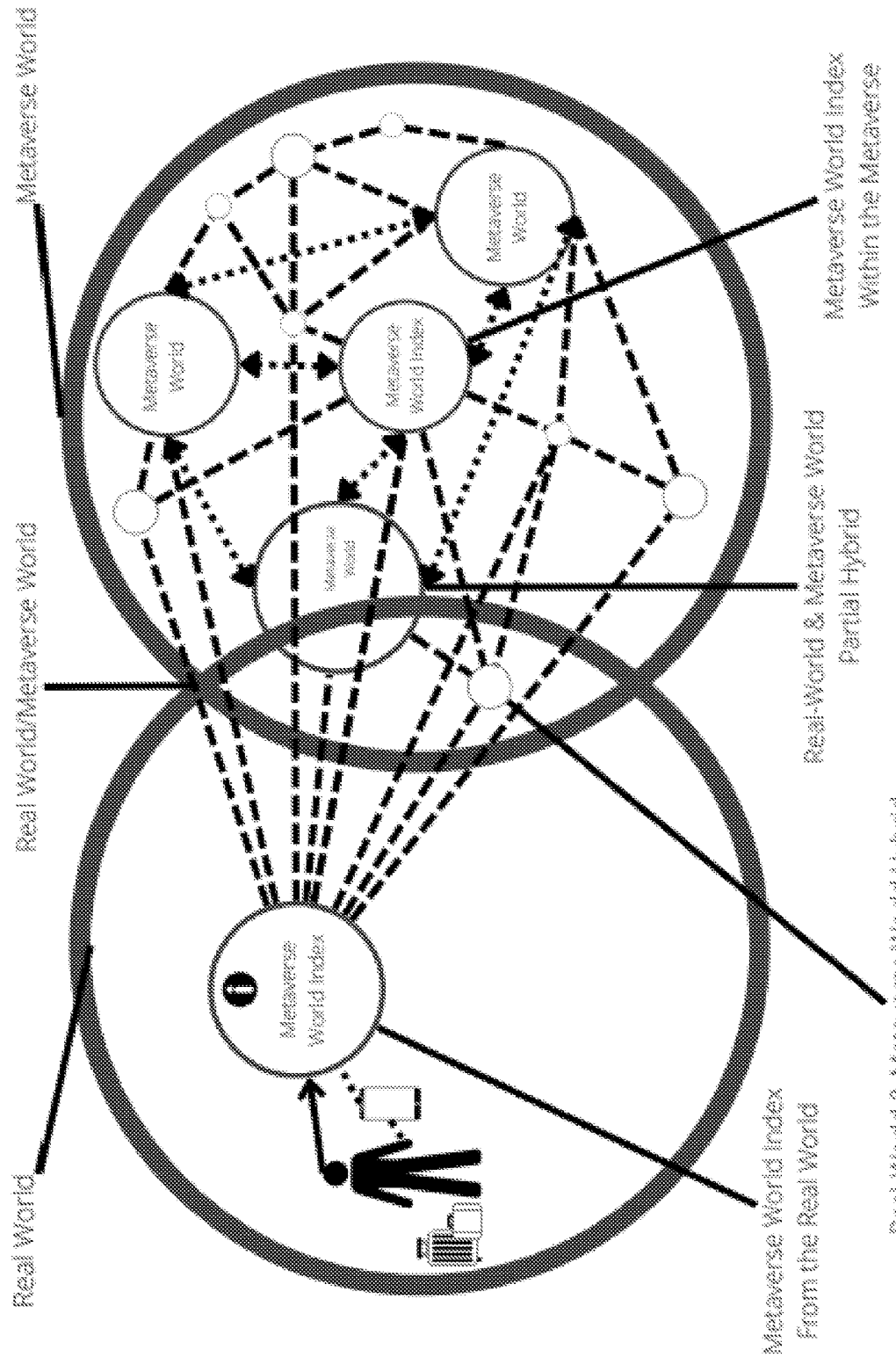
FIG. 19 is yet another schematic of the features of a metaverse system of the present invention.

In FIG. 19, another schematic depicts the connection between the real world and the metaverse world as is part of system 104. As shown, the system will allow for the two worlds, namely a physical world connecting with a metaverse world, to connect and form a hybrid world, wherein the user can experience travel in a combination of the two worlds, using the features of systems 101 and 102 above to full experience a travel related adventure, whether or not the user is able to physically engage in the experiences.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A digital in-flight concierge and in-flight entertainment system, comprising: a first computing device and a second computing device;
   a media platform being accessible from the first computing device and the second computing device and being in communication with one or more servers containing and collecting data;
   a plurality of contents presented to a user through the media platform, the plurality of contents being controlled by an administrator through the media platform;
   a passenger console accessible from the first computing device by the user and configured to provide access to and communication with the media platform as well as receive interactions from the user, the passenger console having:
   a first passenger interface to receive commands and interact with the user, the first passenger interface having a video header to display at least one content from the plurality of content in form of a video, and the first passenger interface having a plurality of tiles, each of the plurality of tiles having a media content displayed therein and each of the plurality of tiles configured to be selected from the user as the user navigates to secondary passenger interfaces for use of the passenger console;
   an administration console accessible from the second computing device by the administrator and to provide access and communication with the media platform, the administrator console having:
   a plurality of administration interfaces each having one or more options for an administrator to make one or more content selections, the one or more content selections manipulating the plurality of contents that are being dynamically updated and customized and presented to the user through the passenger console; wherein the passenger console is accessible via the first computing device via both an internet connection and one or more general purpose airborne media servers; wherein the data includes passenger data and flight data associated with the user, thereby providing for the plurality of contents to be tailored to the user; and
   a metaverse platform accessible from the first computing device, the first computing device having at least one alternate reality device for accessing the metaverse platform; and
   wherein the metaverse platform provides access to the user console by operating with the media platform;
   wherein the metaverse platform provides for use of the content through the alternate reality device to enhance the user's travel experience; and
   wherein the data includes data collected from the user's interaction with the metaverse platform;
   wherein the media platform tracks interactions from the passenger console and the administration console to provide feedback to the administrator; and
   wherein the content includes at least one means of revenue generation for a travel provider as the user uses the passenger console, the travel provider being one or more of an airline, a ground transportation service, a destination service, an e commerce service, an advertiser or digital marketer, and an entertainment provider.

2. The system of claim 1, wherein the plurality of administration interfaces comprises:
   a first interface having at the one or more options for the administrator to make one or more content selections, the one or more content selections including advertisements, assets, collections, pages, clients, roles, and users, the one or content selections being operated by the administrator to open subsequent interfaces for manipulation and management of the plurality of contents.

3. The system of claim 1, wherein at least one content of the plurality of contents includes an advertisement, the advertisement being created by the administrator through the administration console and the advertisement being dynamically updated and customized based on the passenger interaction with the passenger console.

4. The system of claim 1, wherein the data comprises the user data including passenger demographic data, passenger age, passenger race, and passenger sex, and the flight data including flight origin, flight destination, flight number, and seat number.

5. The system of claim 1, wherein the media platform operates online and offline, wherein offline the media platform is served via internal servers on one or more planes, thereby providing the user with a seamless experience through the passenger console, the content remaining active throughout an end to end travel experience for the user.

* * * * *